US010816873B2

(12) United States Patent
Takasaka

(10) Patent No.: US 10,816,873 B2
(45) Date of Patent: Oct. 27, 2020

(54) OPTICAL AMPLIFIER, OPTICAL AMPLIFICATION SYSTEM, WAVELENGTH CONVERTER, AND OPTICAL COMMUNICATION SYSTEM

(71) Applicant: FURUKAWA ELECTRIC CO., LTD., Tokyo (JP)

(72) Inventor: Shigehiro Takasaka, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 344 days.

(21) Appl. No.: 15/952,726

(22) Filed: Apr. 13, 2018

(65) Prior Publication Data

US 2018/0231870 A1 Aug. 16, 2018

Related U.S. Application Data

(63) Continuation of application No. PCT/JP2016/080418, filed on Oct. 13, 2016.

(30) Foreign Application Priority Data

Oct. 13, 2015 (JP) ................. 2015-202370

(51) Int. Cl.
*G02F 1/39* (2006.01)
*H04B 10/2507* (2013.01)
*H04J 14/02* (2006.01)

(52) U.S. Cl.
CPC ............... *G02F 1/395* (2013.01); *G02F 1/39* (2013.01); *G02F 2001/392* (2013.01);
(Continued)

(58) Field of Classification Search
CPC ..................... G02F 1/395; G02F 2001/392
See application file for complete search history.

(56) References Cited

U.S. PATENT DOCUMENTS 9,071,035 B2 6/2015 Otani et al.
9,270,076 B2 2/2016 Takasaka et al.
(Continued)

FOREIGN PATENT DOCUMENTS

CN 1316671 A 10/2001
CN 102012597 A 4/2011
(Continued)

OTHER PUBLICATIONS

Yang et al. "Investigation of Polarization-Insensitive Phase Regeneration Using Polarization-Diversity Phase-Sensitive Amplifier" published in 39th European Conference and Exhibition on Optical Communication (ECOC 2013) (Year: 2013).*
(Continued)

*Primary Examiner* — Eric L Bolda
(74) *Attorney, Agent, or Firm* — Oblon, McClelland, Maier & Neustadt, L.L.P.

(57) ABSTRACT

An optical amplifier includes: a pump-light source unit outputting pump light beams having respective phases modulated; a polarization multiplexer/demultiplexer having first, second, and third ports, demultiplexing a light beam, input from the first port, into polarization components and outputting the demultiplexed light components from the second port and the third port; a first polarization-sensitive optical amplifying fiber unit connected to the second port of the polarization multiplexer/demultiplexer; a second polarization-sensitive optical amplifying fiber unit connected to the third port of the polarization multiplexer/demultiplexer; optical multiplexers/demultiplexers connected to the first polarization-sensitive optical amplifying fiber unit and the second polarization-sensitive optical amplifying fiber unit, respectively; an optical discharge unit, connected between the first polarization-sensitive optical amplifying fiber unit and the second polarization-sensitive optical amplifying
(Continued)

fiber unit, discharging the pump light beams to outside the optical loop; and an optical circulator, having first, second, and third ports, outputting a signal light beam.

15 Claims, 20 Drawing Sheets

(52) U.S. Cl.
CPC ...... *G02F 2203/07* (2013.01); *G02F 2203/50* (2013.01); *H04B 10/2507* (2013.01); *H04J 14/02* (2013.01)

(56) References Cited

U.S. PATENT DOCUMENTS

| | | |
|---|---|---|
| 2014/0043674 A1 | 2/2014 | Takasaka et al. |
| 2014/0253998 A1 | 9/2014 | Otani et al. |
| 2016/0172818 A1 | 6/2016 | Takasaka |

FOREIGN PATENT DOCUMENTS

| | | |
|---|---|---|
| EP | 1 206 016 A1 | 5/2002 |
| EP | 2 682 813 A1 | 1/2014 |
| WO | WO 2012/121223 A1 | 9/2012 |
| WO | WO 2013/077434 A1 | 5/2013 |
| WO | WO 2015/030251 A1 | 3/2015 |

OTHER PUBLICATIONS

International Search Report dated Jan. 17, 2017 in PCT/JP2016/080418 filed Oct. 13, 2016 (with English Translation).
Written Opinion dated Jan. 17, 2017 in PCT/JP2016/080418 filed Oct. 13, 2016.
M. Jazayerifar, et al., "Impact of SBS on Polarization—Insensitive Single—Pump Optical Parametric Amplifiers Based on a Diversity Loop Scheme," ECOC 2014, pp. 1-3.
Takeshi Umeki, et al., "PDM Signal Amplification Using PPLN—Based Polarization—Independent Phase—Sensitive Amplifier," Journal of Lightwave Technology, vol. 33, No. 7, Apr. 2015, pp. 1326-1332.
Masanori Takahashi, et al., "Compact PM-HNLF Module with Increased SBS Threshold having -29 dB polarization crosstalk," OFC/NFOEC Technical Digest, 2012, pp. 1-3.
Shigehiro Takasaka, et al., "Polarization Insensitive Fiber Optical Parametric Amplifier Using a SBS Suppressed Diversity Loop," OFC 2016, 3 Pages.
Extended European Search Report dated May 9, 2019 in Patent Application No. 16855482.2, 12 pages.
Sackey, I. et al., "Design and Performance Evaluation of an OPC Device Using a Dual-Pump Polarization-Independent FOPA", 2014 The European Conference on Optical Communication (ECOC), XP032689321, Sep. 21, 2014, pp. 1-3.
Chinese Office Action with English machine translation dated Aug. 3, 2020 in corresponding Chinese Patent Application No. 201680059478.9, (18 pages).

* cited by examiner

OPTICAL AMPLIFIER, OPTICAL AMPLIFICATION SYSTEM, WAVELENGTH CONVERTER, AND OPTICAL COMMUNICATION SYSTEM

CROSS-REFERENCE TO RELATED APPLICATION(S)

This application is based on a continuation of International Application No. PCT/JP2016/080418, filed on Oct. 13, 2016 which claims the benefit of priority of the prior Japanese Patent Application No. 2015-202370, filed on Oct. 13, 2015, the entire contents of which are incorporated herein by reference.

BACKGROUND

The present disclosure relates to an optical amplifier, an optical amplification system, a wavelength converter, and an optical communication system.

An optical amplifier is indispensable in optical communication. In a current optical communication system, an Erbium-Doped Fiber Amplifier (EDFA), a Raman amplifier, and a Raman amplification system are practically used as an optical amplifier or an optical amplification system in an optical communication band.

SUMMARY

According to an embodiment, an optical amplifier includes a pump-light source unit outputting pump light beams having respective phases modulated; a polarization multiplexer/demultiplexer having first, second, and third ports, the second port and the third port being made of a polarization-sensitive optical fiber, demultiplexing a light beam, input from the first port, into polarization components which are orthogonal to each other and output the demultiplexed light components from the second port and the third port, respectively; a first polarization-sensitive optical amplifying fiber unit connected to the second port of the polarization multiplexer/demultiplexer and having a polarization-sensitive optical amplifying fiber; a second polarization-sensitive optical amplifying fiber unit connected to the third port of the polarization multiplexer/demultiplexer and having a polarization-sensitive optical amplifying fiber; optical multiplexers/demultiplexers connected to the first polarization-sensitive optical amplifying fiber unit and the second polarization-sensitive optical amplifying fiber unit, respectively, to input the pump light beams into the first polarization-sensitive optical amplifying fiber unit and the second polarization-sensitive optical amplifying fiber unit; an optical discharge unit, connected between the first polarization-sensitive optical amplifying fiber unit and the second polarization-sensitive optical amplifying fiber unit to form an optical loop together with the first polarization-sensitive optical amplifying fiber unit and the second polarization-sensitive optical amplifying fiber unit, discharging the pump light beams having propagated through the first polarization-sensitive optical amplifying fiber unit and the second polarization-sensitive optical amplifying fiber unit, respectively, to outside the optical loop; and an optical circulator, having first, second, and third ports, which are made of an optical fiber, outputting a signal light beam, that is input from the first port and that is included in a predetermined wavelength bandwidth, to the second port so as to input to the first port of the polarization multiplexer/demultiplexer connected to the second port, and output a signal light beam, polarization-demultiplexed by the polarization multiplexer/demultiplexer, parametrically amplified by a nonlinear optical effect in the first polarization-sensitive optical amplifying fiber unit and the second polarization-sensitive optical amplifying fiber unit due to the pump light beams in the optical loop, polarization-multiplexed by the polarization multiplexer/demultiplexer, and output from the first port of the polarization multiplexer/demultiplexer to the second port of the optical circulator, from the third port thereof.

DETAILED DESCRIPTION

Figure 1:
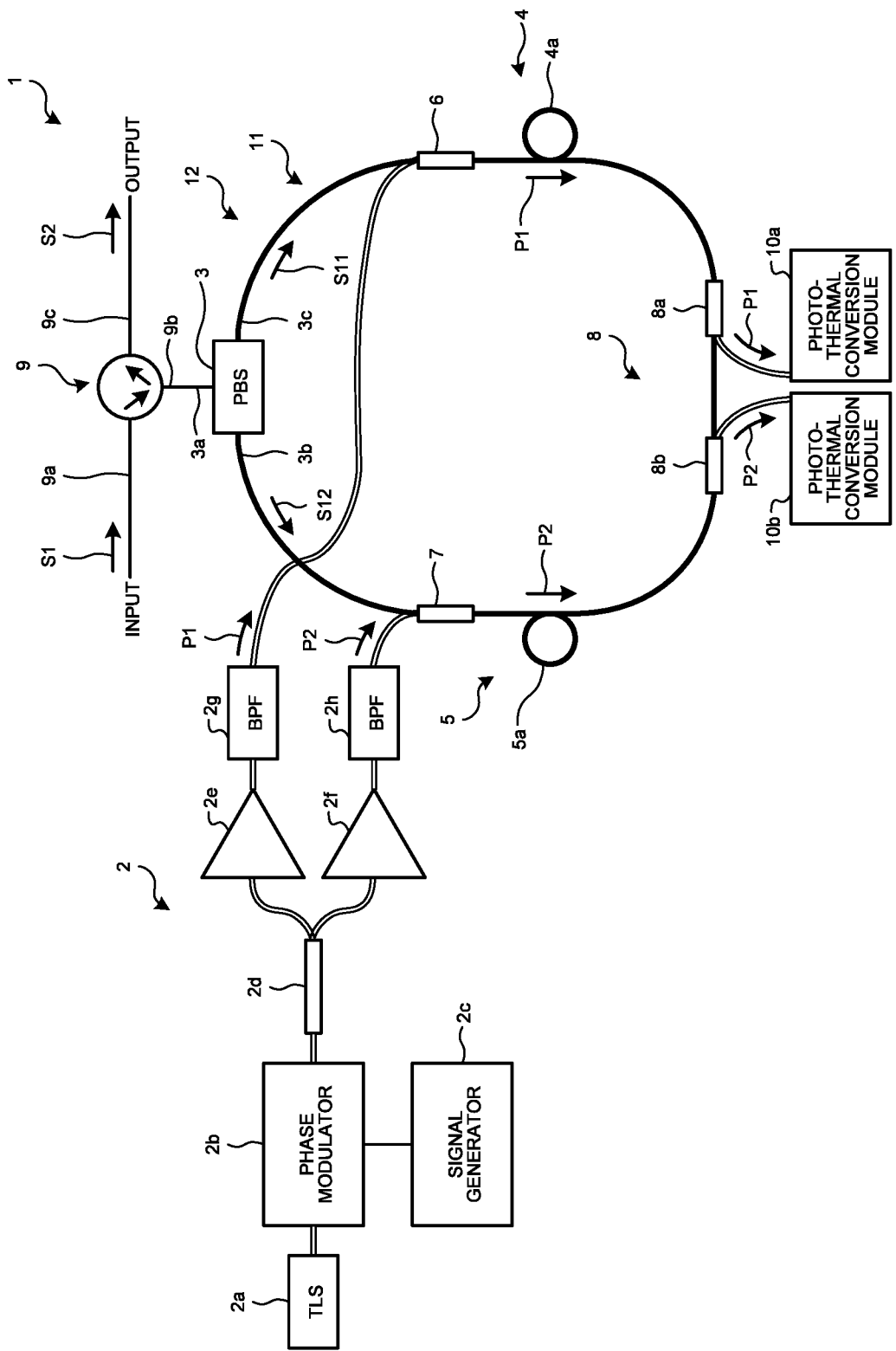
FIG. 1 is a schematic configuration diagram of an optical amplifier according to a first embodiment.

In the related art, by using a Quasi-Phase-Matching (QPM) technique, it becomes possible for a Fiber Optical Parametric Amplifier (FOPA), in which a nonlinear effect in an optical fiber is used for amplification, to perform an amplification applicable to an optical communication system. However, the FOPA has not been practically used yet. One of the main reasons is that the FOPA cannot perform a polarization-insensitive amplification, which is required in the optical communication.

It has been expected that the polarization insensitiveness of the FOPA can be realized by adopting a polarization diversity configuration. However, according to M. Jazayerifar et al., "Impact of SBS on Polarization-Insensitive Single-Pump Optical Parametric Amplifiers Based on a Diversity Loop Scheme," Proceeding of European conference on optical communication 2014, Tu.4.6.4 (2014), because in the polarization diversity configuration, the spectrum width of a pumping light beam having been strongly affected by Stimulated Brillouin Scattering (SBS) and the spectrum width of amplified signal light beam is broaden, the FOPA cannot be applied to an optical amplifier for optical communication requiring a linear amplification.

The present disclosure has been made in view of the above problem and an object of the present disclosure is to provide an optical amplifier, an optical amplification system, a wavelength converter, and an optical communication system in which broadening of the spectrum width of a pump light beam or the spectrum width of an amplified signal light beam is suppressed.

Exemplary embodiments of an optical amplifier, an optical amplification system, a wavelength converter, and an optical communication system according to the present disclosure will be described below in detail with reference to the accompanying drawings. Note that the present disclosure is not limited to the embodiments. In the drawings, the same reference signs are used to describe the same or equivalent constituent elements. It should be noted that these drawings are schematic, and the sizes of respective constituent elements, ratios among the sizes and the like may be different from those of the actual products. In addition, these drawings may include respective sections where dimensional relations or ratios among constituent elements differ from each other.

Figure 19:
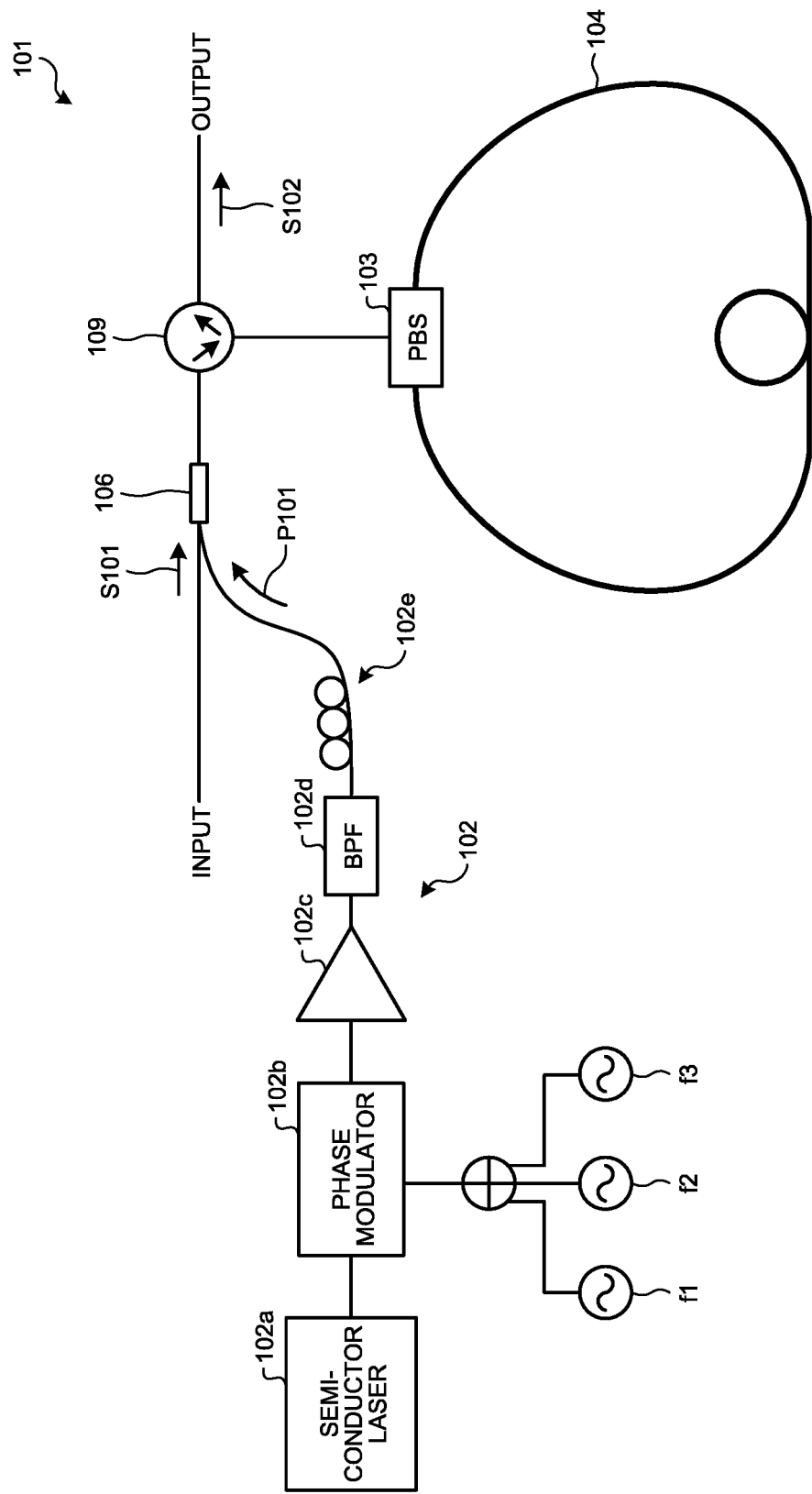
FIG. 19 is a diagram illustrating an example configuration of a polarization-insensitive FOPA using a polarization diversity configuration.

FIG. 19 is a diagram illustrating an example of a configuration of a polarization-insensitive FOPA 101 using a polarization diversity configuration, which is described in FIG. 1 of M. Jazayerifar et al., "Impact of SBS on Polarization-Insensitive Single-Pump Optical Parametric Amplifiers Based on a Diversity Loop Scheme," Proceeding of European conference on optical communication 2014, Tu.4.6.4 (2014). In FIG. 19, a thick line represents a polarization-maintaining optical fiber and a thin line represents an optical fiber not maintaining polarization. In a pump-light source unit 102, a pump light P101 is obtained by modulating a continuous wave CW output from a semiconductor laser 102a of a wavelength-tunable external cavity type using a phase modulator 102b driven by sine waves having frequencies f1, f2, and f3, which are different from each other, and then amplifying the resultant wave using an EDFA 102c. Amplified Spontaneous Emission (ASE) light beams emitted from the EDFA 102c are then removed by a Band Pass Filter (BPF) 102d, the polarization state is adjusted by a polarization controller 102e, and the adjusted light is output. Signal light beam S101 and the pump light P101 are combined by an optical coupler 106 including a filter such as a Wavelength Division Multiplexing (WDM) filter or a branching filter, and a resultant light is passed through an optical circulator 109 and is then split by a Polarization Beam Splitter (PBS) 103 into an x-polarization wave and a y-polarization wave orthogonal to each other. The polarization controller 102e used in the pump-light source unit 102 adjusts power levels of the polarization waves of the pump light split by the PBS to be equal to each other. The signal light beams and the pump light beams having the same polarization waves split by the PBS 103 propagate clockwise and counter-clockwise, respectively, through an optical loop constituted of an optical amplifying fiber 104, which is a Polarization Maintaining-Highly Non-Linear Fiber (PM-HNLF) provided at a subsequent stage of the PBS. At that time, the light beams propagating in opposite directions propagate through the same polarization axis of the optical amplifying fiber. Accordingly, the optical distances of propagation by which these light beams respectively propagate are the same in the clockwise direction and the counter-clockwise direction, and thus no phase difference occurs therebetween when the polarization waves of these light beams are combined again in the PBS 103. The signal light beams in the both directions of propagation are amplified by a parametric effect when passing through the optical amplifying fiber 104. A signal light beam S102 obtained by a polarization combination and an amplification by the PBS 103 passes through an optical circulator 109 and then is output.

In the polarization-insensitive FOPA 101, the phase of the pump light beam P101 is modulated and the light spectrum width thereof is broadened in order to avoid occurrence of SBS in the optical amplifying fiber 104. The central wavelength of the pump light beam P101 is a wavelength at which a semiconductor laser 102a emits light beams and a certain level of power of the pump light beam is present also at wavelengths 9 to 11 GHz away from the central wavelength due to the phase modulation. The frequency of a Longitudinal Acoustic-mode (LA) introduced and pumped by SBS in the optical amplifying fiber 104 is generally 9 to 11 GHz. When SBS occurs, the wavelength (optical frequency) of the pump light beam reflects a light beam deviated by the frequency of the LA due to the Doppler effect.

When the pump light beam propagates only in one direction through the optical amplifying fiber 104, a reflection light beam (more precisely, a Brillouin scattered light beam) generated by a thermally-pumped LA interferes with the pump light beam. Light power generated by the interference increases the power of the LA through a photo-elastic effect of the same period as that of the LA. As a result, power of the pump light beam scattered (reflected) by the LA increases. SBS occurs according to a principle that the increased reflection light beam further increases the power of the LA.

On the other hand, when a pump light beam having a spectrum broadened by phase modulation propagates through the optical amplifying fiber 104 in the both directions, a light beam (pump light beam) having power of a few orders of magnitude greater than the reflection of the thermally-pumped LA propagates in the opposite directions. Accordingly, interference between the pump light beams propagating in the both directions inductively pumps the LA, so that SBS occurs even with considerably smaller power than in the case where the pump light beam is propagated only in one direction.

Therefore, higher-order SBS, which is SBS caused by a light beam reflected by SBS, easily occurs and the spectrum width of the pump light beam greatly broadens. The spectrum width of the signal light beam parametrically amplified by the pump light beam having a larger spectrum width also broadens and deteriorates information quality in performing optical communication. That is, the FOPA does not function as an optical amplifier for optical communication any more.

Figure 20:
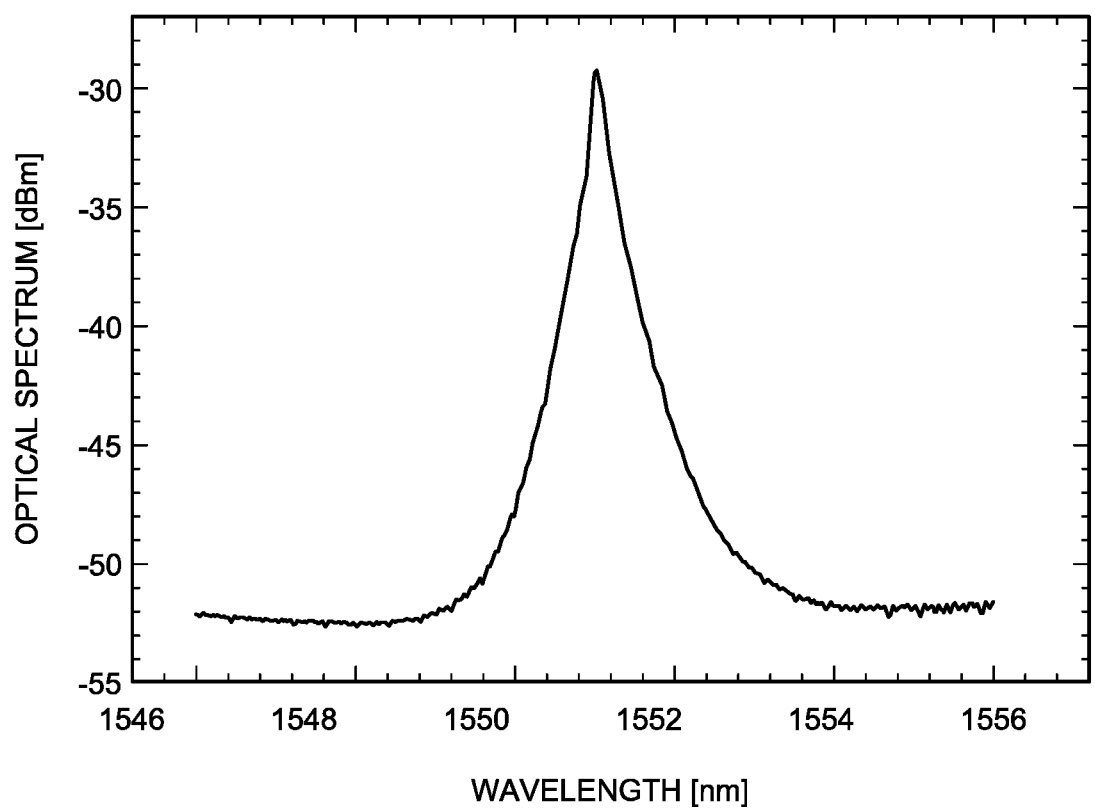
FIG. 20 is a diagram illustrating an example spectrum of signal light beam having a spectrum width broadened by SBS.

FIG. 20 illustrates an example of the spectrum of a signal light beam having a spectrum width broadened by SBS. FIG. 20 illustrates an example where a signal driving the phase modulator 102b in the polarization-insensitive FOPA 101 of FIG. 19 was changed to white noise with a bandwidth of 1.2 GHz and the signal light beam was measured by a polarization-insensitive FOPA using the optical amplifying fiber 104 having a zero dispersion wavelength near 1565 nm. Power of the pump light beam P101 near the wavelength of 1565 nm was set to 7 W, and a CW light beam having a linewidth of approximately 100 kHz at a wavelength of 1551 nm was used as the signal light beam S101 and was parametrically amplified. A signal light beam output from the optical circulator 109 was attenuated by an optical attenuator and then was measured by an optical spectrum analyzer. It is understood from FIG. 20 that the signal light beam having a line spectrum of the linewidth of 100 kHz became a signal light beam having a spectrum width of several nm as a result of the parametric amplification.

In contrast thereto, with optical amplifiers according to embodiments described below, broadening of the spectrum width of a pumping light beam or the spectrum width of an amplified signal light beam is suppressed.

First Embodiment

FIG. 1 is a schematic configuration diagram of an optical amplifier according to a first embodiment. An optical amplifier 1 is configured as a polarization-insensitive FOPA. The optical amplifier 1 includes a pump-light source unit 2, a polarization multiplexer/demultiplexer (PBS) 3, a first polarization-sensitive optical amplifying fiber unit 4, a second polarization-sensitive optical amplifying fiber unit 5, WDM couplers 6 and 7 each being an optical multiplexer/demultiplexer, an optical discharge unit 8, an optical circulator 9, and photothermal conversion modules 10a and 10b. A thick line or a double line in FIG. 1 represents a polarization-maintaining optical fiber and a thin line represents an optical fiber not maintaining polarization.

The pump-light source unit 2 includes a Tunable Light Source (TLS) 2a serving as a pump light source, a phase modulator 2b, a signal generator 2c, a polarization-maintaining 3 dB coupler 2d, polarization-maintaining optical amplifiers 2e and 2f, and BandPass Filters (BPF) 2g and 2h. The pump-light source unit 2 outputs phase-modulated pump light beams P1 and P2, which will be described later.

The PBS 3 includes a first port 3a, and a second port 3b, and a third port 3c, which are made of a polarization-sensitive optical fiber, and splits a light beam input from the first port 3a into polarization components orthogonal to each other to be output from the second port 3b and the third port 3c, respectively.

The first polarization-sensitive optical amplifying fiber unit 4 is connected to the third port 3c of the polarization multiplexer/demultiplexer 3 and is constituted of a polarization-sensitive optical amplifying fiber 4a, which is a PM-HNLF. The second polarization-sensitive optical amplifying fiber unit 5 is connected to the second port 3b of the polarization multiplexer/demultiplexer 3 and is constituted of a polarization-sensitive optical amplifying fiber 5a, which is a PM-HNLF.

The WDM couplers 6 and 7 are placed between the PBS 3 and the first polarization-sensitive optical amplifying fiber unit 4, the second polarization-sensitive optical amplifying fiber unit 5, respectively. The WDM couplers 6 and 7 are connected so as to input the pump light beams P1 and P2 to the first polarization-sensitive optical amplifying fiber unit 4 and the second polarization-sensitive optical amplifying fiber unit 5, respectively.

The optical discharge unit 8 includes WDM couplers 8a and 8b. The optical discharge unit 8 is connected between the first polarization-sensitive optical amplifying fiber unit 4 and the second polarization-sensitive optical amplifying fiber unit 5 and constitutes an optical loop 11 together with the first polarization-sensitive optical amplifying fiber unit 4 and the second polarization-sensitive optical amplifying fiber unit 5. The optical discharge unit 8 has a function to discharge the pump light beams P1 and P2 having propagated through the first polarization-sensitive optical amplifying fiber unit 4 and the second polarization-sensitive optical amplifying fiber unit 5, respectively, to outside the optical loop 11, as will be described later.

The optical circulator 9 includes a first port 9a, a second port 9b, and a third port 9c, which are made of an optical fiber. The second port 9b is connected to the first port 3a of the PBS 3. When a signal light beam S1 included in a predetermined wavelength bandwidth is input from the first port 9a, the optical circulator 9 outputs the signal light beam S1 from the second port 9 to the PBS 3. As will be described later, when a signal light beam S2 obtained by amplifying the signal light beam S1 is output from the first port 3a of the PBS 3 to the second port 9b of the optical circulator 9, the signal light beam S2 is output from the third port 9c. The optical circulator 9, the PBS 3, and the optical loop 11 constitute a polarization diversity configuration 12.

The photothermal conversion modules 10a and 10b are connected to the optical discharge unit 8 and are modules for converting the pump light beams P1 and P2 discharged from the optical discharge unit 8 into heat to release the heat.

Next, the pump-light source unit 2 is specifically described. The pump light beams P1 and P2 are generated and output in the following manner. A CW light beam having a linearly polarized wave output from the TLS 2a is subjected to phase modulation by the phase modulator 2b driven by an RF signal output from the signal generator 2c. The CW light is then branched into two in the power by the polarization-maintaining 3 dB coupler 2d. The branched elements are then amplified by the polarization-maintaining optical amplifiers 2e and 2f, respectively, and unwanted ASE light beams generated in the polarization-maintaining optical amplifiers 2e and 2f are removed by the BPFs 2g and 2h, respectively. Accordingly, the respective CW light beams are output as the phase-modulated pump light beams P1 and P2.

The pump light source may not be the TLS 2a and may be any light source that generates a CW light beam, such as a Distributed FeedBack-Laser Diode (DFB-LD) or an external-cavity semiconductor LD. The polarization-maintaining 3 dB coupler 2d may be placed at any position as long as it is between the polarization-maintaining optical amplifiers 2e and 2f and the TLS 2a. However, when the polarization-maintaining 3 dB coupler 2d is placed at a previous stage of the phase modulator 2b, two phase modulators 2b are used so as to enable branched CW light beams to be phase-modulated, respectively. When two phase modulators 2b are used, driving FR signals do not always need to be the same and the two phase modulators 2b may be driven by signals in any relation of different phases such as opposite phases. Sine waves having different frequencies can be used or the bandwidth or frequency region of white noise can be changed. As long as the polarization-maintaining optical amplifiers 2e and 2f can amplify the CW light beam while maintaining the polarization, a PM-EDFA, a PM-Erbium-Ytterbium-Doped Fiber Amplifier (PM-EYDFA), or a PM Raman amplifier may be applied thereto. The polarization-maintaining 3 dB coupler 2d does not always need to have a branch ratio of 1:1 and may be replaced by a polarization-maintaining coupler having a different branch ratio such as 10:1. However, in order to equalize the qualities of the pump light beams output from the two polarization-maintaining optical amplifiers 2e and 2f, levels of optical power input to the polarization-maintaining optical amplifiers 2e and 2f are desirably equal. As long as the pass bandwidths of the BPFs 2g and 2h are greater than the spectrum bandwidth of the CW light beam, it is preferable that the pass bandwidths be as narrow as possible because more unwanted ASE light beams can be eliminated. A combination of a polarization-maintaining circulator and a polarization-maintaining Fiber Bragg Grating (FBG) or an Arrayed Waveguide Grating (AWG) as well as a dielectric multilayer filter can be cited as candidates of the BPFs 2g and 2h.

The polarization-maintaining optical amplifier may be placed at any position as a preamplifier depending on a need such as compensation of loss of optical components or improvement of Noise Figures (NFs) of the polarization-maintaining optical amplifiers 2e and 2f as long as it is between the BPF 2g, 2h and the TLS 2a.

An operation of the optical amplifier 1 is described. The optical circulator 9 outputs the signal light beam S1 input through the first port 9a to the PBS 3 from the second port 9b. The PBS 3 splits the input signal light beam S1 into signal light beams S11 and S12 of polarization components orthogonal to each other and outputs the signal light beams S11 and S12 from the second port 3b and the third port 3c, respectively.

Next, the WDM coupler 6 multiplexes the pump light beam P1 and the signal light beam S11 while keeping the polarization waves aligned with each other, the WDM coupler 7 multiplexes the pump light beam P2 and the signal light beam S12 while keeping the polarization waves aligned with each other, and resultant light beams are input to the first polarization-sensitive optical amplifying fiber unit 4 and the second polarization-sensitive optical amplifying fiber unit 5, respectively. The signal light beams S11 and S12 propagate through the optical loop 11 clockwise and counter-clockwise, respectively. At that time, the light beams propagating in the opposite directions propagate through the same polarization axes (slow axes, for example) of the first polarization-sensitive optical amplifying fiber unit 4 and the second polarization-sensitive optical amplifying fiber unit 5. Accordingly, the optical distances of propagation by which the signal light beams S11 and S12 propagate are the same in the clockwise direction and the counter-clockwise direction and thus no phase difference occurs when the polarization waves of these light beams are combined again in the PBS 3.

The signal light beam S11 is amplified by the parametric effect when passing through the first polarization-sensitive optical amplifying fiber unit 4, and the signal light beam S12 is amplified by the parametric effect when passing through the second polarization-sensitive optical amplifying fiber unit 5. In the polarization-sensitive optical amplifying fiber units 4 and 5, idler light beams are generated from the pump light beam and the signal light beam due to a nonlinear optical effect of the polarization-sensitive optical amplifying fiber units 4 and 5.

The WDM coupler 8a of the optical discharge unit 8 has a function to discharge the pump light beam P1 out of the signal light beam S11, the pump light beam P1, and the idler light beam having propagated through the first polarization-sensitive optical amplifying fiber unit 4 to outside the optical loop 11. Specifically, the WDM coupler 8a includes three ports made of an optical fiber, which are connected to the first polarization-sensitive optical amplifying fiber unit 4, the WDM coupler 8b, and the photothermal conversion module 10a, respectively. The WDM coupler 8a has wavelength characteristics of transmitting the signal light beam S11 and the idler light beam out of the signal light beam S11, the pump light beam P1, and the idler light beam having propagated through the first polarization-sensitive optical amplifying fiber unit 4 to the WDM 8b and outputting the pump light beam P1 to the photothermal conversion module 10a located outside the optical loop 11.

Similarly, the WDM coupler 8b of the optical discharge unit 8 has a function to discharge the pump light beam P2 out of the signal light beam S12, the pump light beam P2, and the idler light beam having propagated through the second polarization-sensitive optical amplifying fiber unit 5 to outside the optical loop 11. Specifically, the WDM coupler 8b includes three ports made of an optical fiber, which are connected to the second polarization-sensitive optical amplifying fiber unit 5, the WDM coupler 8a, and the photothermal conversion module 10b, respectively. The WDM coupler 8b has wavelength characteristics of transmitting the signal light beam S12 and the idler light beam out of the signal light beam S12, the pump light beam P2, and the idler light beam having propagated through the second polarization-sensitive optical amplifying fiber unit 5 to the WDM 8a and outputting the pump light beam P2 to the photothermal conversion module 10b located outside the optical loop 11.

As a result, the PBS 3 outputs the signal light beam S2, generated by polarization combination of the amplified signal light beams S11 and S12 having traveled the optical loop 11 and amplified, to the optical circulator 9, and the optical circulator 9 outputs the signal light beam S2 from the third port 9c.

That is, in the optical amplifier 1, the pump light beams P1 and P2 propagate through the polarization-sensitive optical amplifying fiber units 4 and 5 only in one direction, respectively, and are discharged outside in the middle of the optical loop 11 in order to prevent an occurrence of SBS and higher-order SBS. For example, a part of the pump light beam P1 passes through the WDM coupler 8a along with the signal light beam S11 although the power of the pump light beam P1 is considerably small. However, almost all of the power is discharged outside the optical loop 11 by the second WDM coupler 8b.

This considerably lowers the intensity of a pump light beam propagating in the direction opposite to that the direction of the other pump light beam in the optical amplifier 1, and thus broadening of the spectrum width of the pump light beam or the spectrum width of the amplified signal light beam can be suppressed.

Any device, such as a type using a BPF or a type using a Short Pass Filter (SPF) or an Long Pass Filter (LPF), may be used as the WDM couplers 8a and 8b which are the devices that constitute the optical discharge unit 8 as long as the device can separate the pump light beam from the signal light beam. As the optical fiber that discharges the pump light beam, a multimode optical fiber having a large core diameter may be used so as to keep the pump-light discharge characteristics regardless of axis misalignment in the device due to a temperature change.

Next, the photothermal conversion modules 10a and 10b are described. The pump light beam to be discharged is output from an optical fiber port connected to the pump light beam in the WDM couplers 8a and 8b. In order to operate the optical amplifier 1 safely and stably, the pump light beam to be discharged is desired to be converted into heat in the photothermal conversion modules 10a and 10b by a safety method. As a method of converting the light beam to heat, the photothermal conversion modules 10a and 10b preferably have a configuration to apply the light beam to metal or non-metal that is processed to absorb the pump light beam and bring the metal or the non-metal to thermal contact with a heat sink or to form metal or a non-metal itself as a heat sink. Candidates of the metal to be used are, for example, black alumite (anodized aluminum), and aluminum, copper, and iron coated with black ceramic. A candidate of the non-metal is, for example, graphite.

There is a possibility that reflection from a facet of the optical fiber that propagates the pump light beam to be discharged destabilizes the operation of the optical amplifier 1 or fluctuates gain characteristics, resulting in negative influences. To avoid this problem, the following methods can be applied.

One of the methods is diagonally cutting the facet of the optical fiber or connecting an Angled Physical Contact (APC) connector thereto. Another method is winding the optical fiber plural times to have a diameter less than that which causes loss due to bending and discharging the pump light beam in the longitudinal direction of the optical fiber. In the latter method, the pump light beam is discharged from the optical fiber after passing through coated resin and thus it is also preferable that polyimide resin resistant to heat be used as the coated resin of the optical fiber. Furthermore, it is preferable to perform a treatment such as bringing the optical fiber to thermal contact with a heat sink using a material that increases a contact cross-section area, such as grease, to cool the optical fiber. Use of one or both of the two methods described above can suppress the discharged pump light beam from reflecting on the facet of the optical fiber and propagating in the opposite direction.

When the optical path of the optical amplifier 1 is constituted of an optical fiber, it is preferable to connect the optical fiber with fusion splicing or polarization-maintaining fusion splicing as much as possible because optical loss and polarization axis misalignment can be suppressed. However, when connecting the optical fiber with an optical connector is more efficient for manufacturing, the connection with fusion splicing or polarization-maintaining fusion splicing may not be performed. When an optical connector is applied to a place where a high-power pump light beam propagates, an APC connector is preferably used to prevent facet reflection or suppress thermal damages and the like on a connection face.

Second Embodiment

Next, an optical amplifier according to a second embodiment is described. For practical use of the polarization-insensitive FOPA, the polarization-sensitive gain is desired to be small, for example, to be equal or less than 0.5 dB. Otherwise, the quality of an amplified signal is degraded and an error at the time of receiving an optical signal is increased. Therefore, it is preferable to control one or both of the power of the pump light beam P1 that parametrically amplifies the signal light beam S11 propagating clockwise and is input to the first polarization-sensitive optical amplifying fiber unit 4 and the power of the pump light beam P2 that parametrically amplifies the signal light beam S12 propagating counter-clockwise and is input to the second polarization-sensitive optical amplifying fiber unit 5 in the first embodiment to cause the gain difference to be equal to or less than 0.5 dB. This can make the polarization-sensitive gain to be equal to or less than 0.5 dB.

Figure 2:
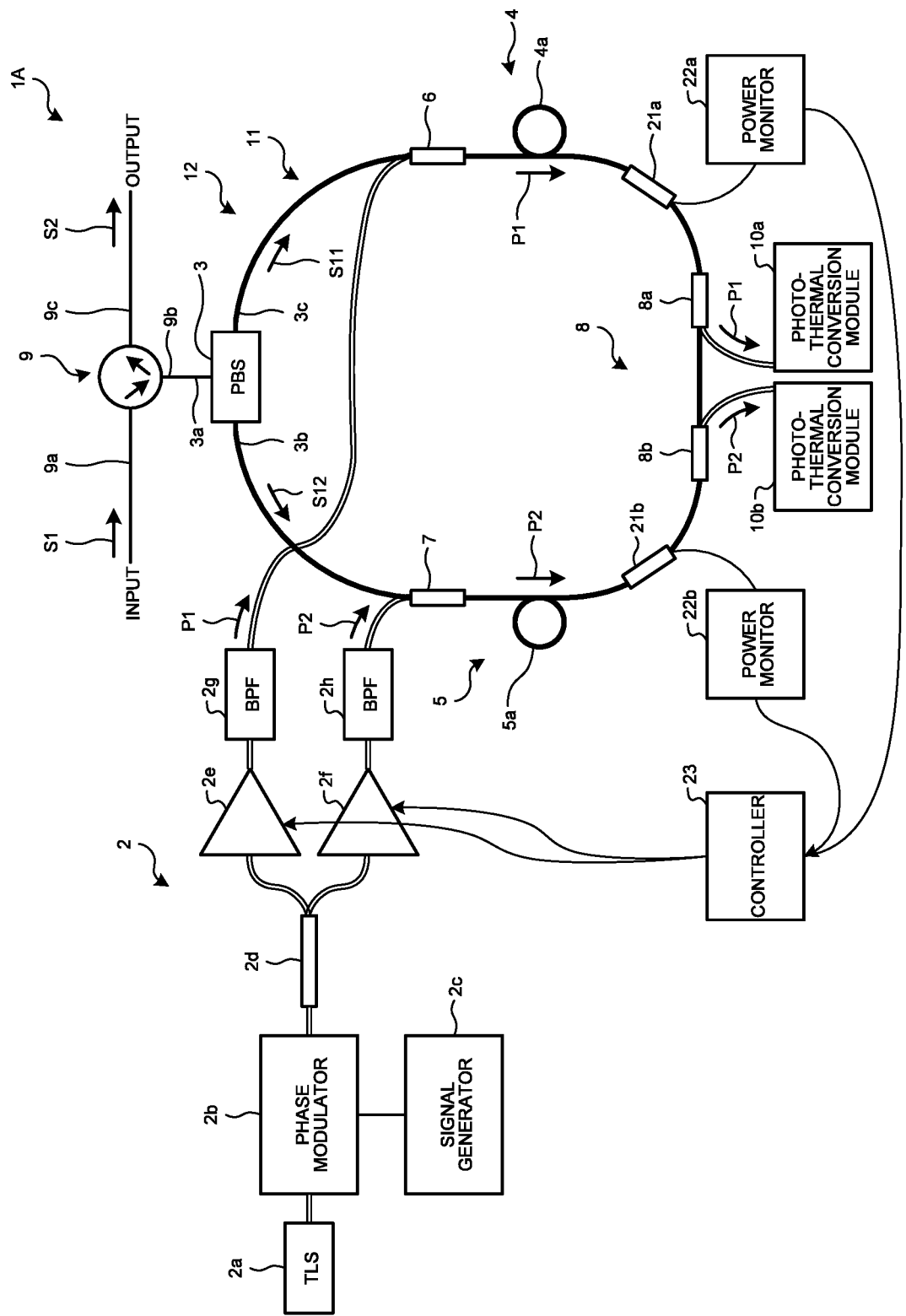
FIG. 2 is a schematic configuration diagram of an optical amplifier according to a second embodiment.

FIG. 2 is a schematic configuration diagram of the optical amplifier according to the second embodiment. This optical amplifier 1A has a configuration in which monitoring optical couplers 21a and 21b, power monitors 22a and 22b, and a controller 23 are added to the optical amplifier 1.

The monitoring optical couplers 21a and 21b are polarization-maintaining optical couplers using a BPF and placed between the first polarization-sensitive optical amplifying fiber unit 4 and the optical discharge unit 8 and between the second polarization-sensitive optical amplifying fiber unit 5 and the optical discharge unit 8, respectively. However, the positions where the monitoring optical couplers 21a and 21b are placed are not particularly limited thereto as long as the positions are between the first polarization-sensitive optical amplifying fiber unit 4 and the second polarization-sensitive optical amplifying fiber unit 5. For example, the connection order of the WDM coupler 8a, 8b in the optical discharge unit 8 and the monitoring optical coupler 21a, 21b may be opposite to those illustrated in FIG. 2.

The monitoring optical couplers 21a and 21b extract parts of ASE light beams at a wavelength outside a signal wavelength bandwidth including the signal light beam S1 in a gain wavelength bandwidth of the gains of parametric amplifications performed by the first polarization-sensitive optical amplifying fiber unit 4 and the second polarization-sensitive optical amplifying fiber unit 5, respectively, and output the extracted parts to the power monitors 22a and 22b. For example, when the signal wavelength bandwidth is a C band (1530 nm to 1565 nm) and the wavelength of the pump light beam is 1565 nm, ASE light beams in a wavelength region, for example, from 1520 nm to 1525 nm as a wavelength region where there are ASE light beams on a shorter wavelength side than 1530 nm are extracted.

The power monitors 22a and 22b include, for example, a Photo Diode (PD) and receive the ASE light beams extracted by the monitoring optical couplers 21a and 21b, respectively, to output current signals of values corresponding to power levels of the received ASE light beams.

The controller 23 controls the polarization-maintaining optical amplifiers 2e and 2f so as to adjust the power levels of the pump light beams output from the polarization-maintaining optical amplifiers 2e and 2f, respectively, based on the values of the current signals input from the power monitors 22a and 22b. This adjusts the power levels of the pump light beams P1 and P2, which are input to the first polarization-sensitive optical amplifying fiber unit 4 and the second polarization-sensitive optical amplifying fiber unit 5, respectively.

At this time, the power levels of the pump light beams P1 and P2 are adjusted in such a manner that the gain waveforms of the respective parametric amplifications of the first polarization-sensitive optical amplifying fiber unit 4 and the second polarization-sensitive optical amplifying fiber unit 5 have a difference equal to or less than 0.5 dB at least in the signal wavelength bandwidth including the signal light beam S1 in the gain wavelength bandwidth of the parametric amplifications. Accordingly, the polarization-sensitive gain can be made to be equal to or less than 0.5 dB.

It should be noted that the control of the power levels of the pump light beams P1 and P2 for equalizing the power levels of the monitored ASE light beams does not always minimize the polarization-sensitive gain. Because the first polarization-sensitive optical amplifying fiber unit 4 and the second polarization-sensitive optical amplifying fiber unit 5 where the general fiber characteristics such as the nonlinearity and the dispersion property are equivalent but are strictly not the same are used for the parametric amplifications of the clockwise signal light beam S11 and the counter-clockwise signal light beam S12, respectively, there is a case where the respective wavelength characteristics of the ASE light beams do not coincide with each other. It is preferable to previously measure a ratio of power between the ASE light beams in the both directions of propagation, to which the power levels of the pump light beams P1 and P2 are to be controlled to minimize the polarization-sensitive gain. It is alternatively possible to input a CW light beam serving as a probe to outside the signal wavelength region, instead of the ASE light beam, and to monitor the power of the amplified CW light beam to control the power levels of the pump light beams output from the polarization-maintaining optical amplifiers 2e and 2f.

It is alternatively possible to previously measure pump-light output power levels of the polarization-maintaining optical amplifiers 2e and 2f to enable the gains of the respective parametric amplifications by the first polarization-sensitive optical amplifying fiber unit 4 and the second polarization-sensitive optical amplifying fiber unit 5 to have a difference equal to or less than 0.5 dB in at least one wavelength of the gain wavelength bandwidth of the parametric amplifications and to perform adjustment to obtain the measured levels, without using the power monitors 22a and 22b.

Third Embodiment

Next, an optical amplifier according to a third embodiment is described. When a WDM signal light beam instead of a signal light beam of a single wavelength is input as the signal light beam S1 to the polarization-insensitive FOPA and is amplified, the wavelength dependency of the polarization-sensitive gain is desired to be reduced to be equal or lower than 0.5 dB. To realize this, for example, when the Zero Dispersion Wavelength (ZDW) of a polarization-sensitive optical amplifying fiber is within a range from 5 nm shorter than the wavelength of the pump light beam to longer than the wavelength of the pump light beam, the ZDW and the wavelength of the pump light beam are adjusted to reduce the wavelength dependency of the polarization-sensitive gain. When the ZDW and the pump wavelength are equal, the gain shape of the parametric amplification is flat with respect to the wavelength and has a maximum gain bandwidth. When the pump wavelength is set on a longer wavelength side of the ZDW, the gain increases as the distance from the pump light wavelength increases and then conversely decreases when the distance becomes greater than a certain wavelength interval. That is, the gain waveform is convex upward having the maximum value at a certain wavelength. When the pump wavelength is located on a shorter wavelength side of the ZDW, the gain waveform is convex upward having the maximum gain at the pump wavelength and the gain bandwidth is reduced as compared to the case where the ZDW and the pump wavelength are equal.

Figure 3:
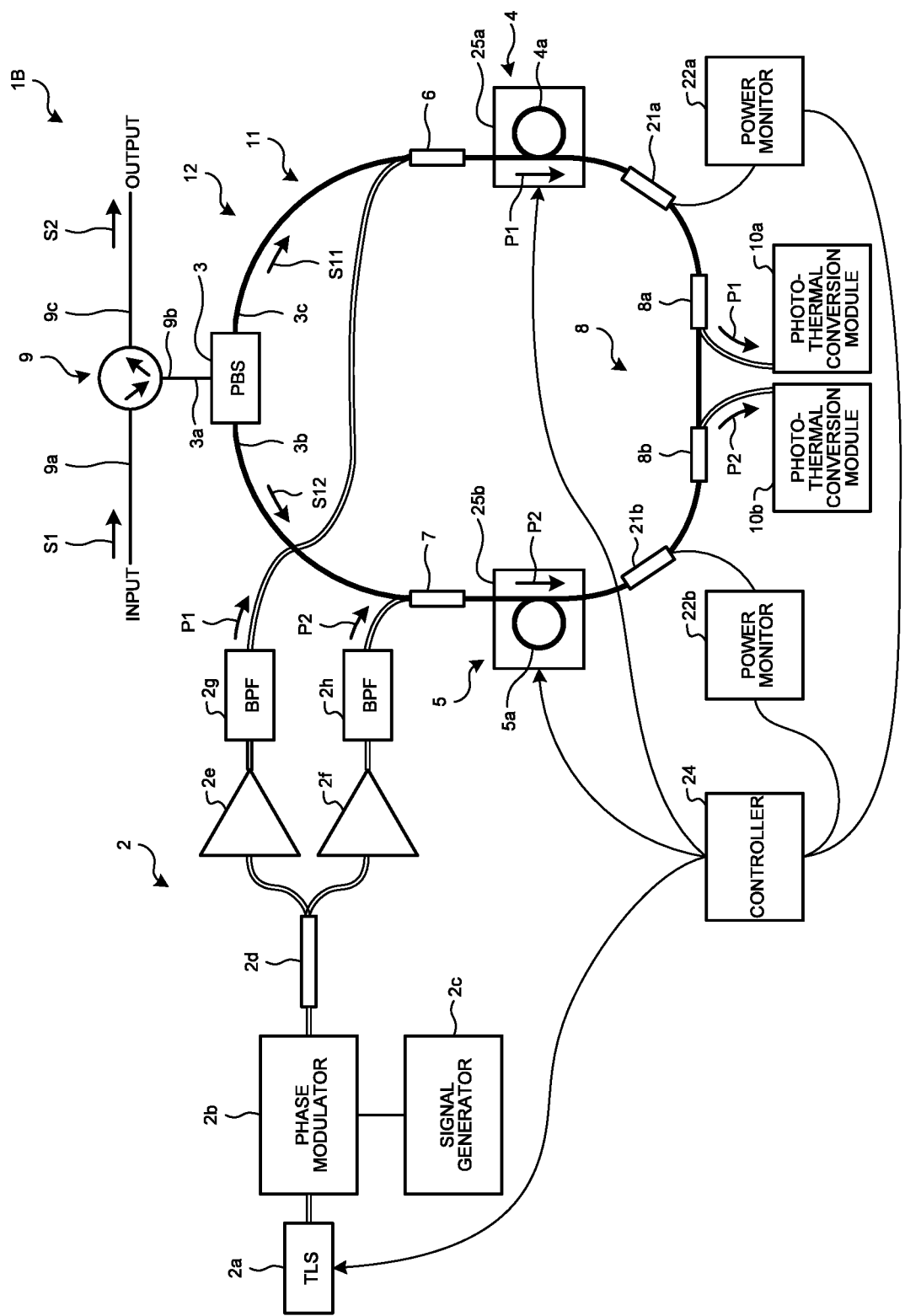
FIG. 3 is a schematic configuration diagram of an optical amplifier according to a third embodiment.

FIG. 3 is a schematic configuration diagram of the optical amplifier according to the third embodiment. This optical amplifier 1B has a configuration in which the controller 23 is replaced by a controller 24 and temperature adjusters 25a and 25b are added in the optical amplifier 1A.

The temperature adjusters 25a and 25b adjust temperatures of the first polarization-sensitive optical amplifying fiber unit 4 and the second polarization-sensitive optical amplifying fiber unit 5, respectively.

When the respective temperatures of the first polarization-sensitive optical amplifying fiber unit 4 and the second polarization-sensitive optical amplifying fiber unit 5 are set high, the ZDWs of the respective polarization-sensitive optical amplifying fibers 4a and 5a included therein are shifted to a longer wavelength side.

The controller 24 controls at least one or both of the temperature adjusters 25a, 25b and the TLS 2a based on the values of the current signals input from the power monitors 22a and 22b, respectively. Specifically, the controller 24 executes control to cause the temperature adjusters 25a and 25b to adjust the respective temperatures of the first polarization-sensitive optical amplifying fiber unit 4 and the second polarization-sensitive optical amplifying fiber 5 so as to adjust the ZDWs. Alternatively, the controller 24 executes control to adjust the wavelength of the CW light beam output from the TLS 2a to adjust the wavelength of the pump light beams P1 and P2.

At that time, the controller 24 controls at least one or both of the temperature adjusters 25a, 25b and the TLS 2a in such a manner that the respective gain waveforms of the parametric amplifications of the first polarization-sensitive optical amplifying fiber unit 4 and the second polarization-sensitive optical amplifying fiber unit 5 have a difference equal to or less than 0.5 dB at least in a signal wavelength bandwidth including the signal light beam S1 in the gain wavelength bandwidth of the parametric amplifications. This can set the polarization-sensitive gain to be equal to or lower than 0.5 dB.

A configuration example of the temperature adjuster 25a is described. The temperature adjuster 25b may have the same configuration. In the temperature adjuster 25a, the polarization-sensitive optical amplifying fiber 4a is wound in the form of a coil with an inner diameter of 60 millimeters, for example. At that time, the polarization-sensitive optical amplifying fiber 4a is not held in a state of being wound around a core but is held, for example, in a state of a coil not wound around a core so as not to apply a lateral pressure to the polarization-sensitive optical amplifying fiber 4a to prevent degradation of a polarization extinction ratio. The polarization-sensitive optical amplifying fiber 4a in the form of a coil is protected in a metal case or the like, a device that increases or decreases the temperature, such as a heater or a Peltier element, is provided on the metal case, and the device is brought into thermal contact with a temperature sensor such as a thermocouple, a thermistor, or a platinum resistor. The polarization-sensitive optical amplifying fiber 4a is then controlled using a temperature controller to have an appropriate temperature. At that time, it is preferable to cover the metal case with a thermal insulant because power consumed by the device that increases or decreases the temperature can be reduced.

Fourth Embodiment

Figure 4:
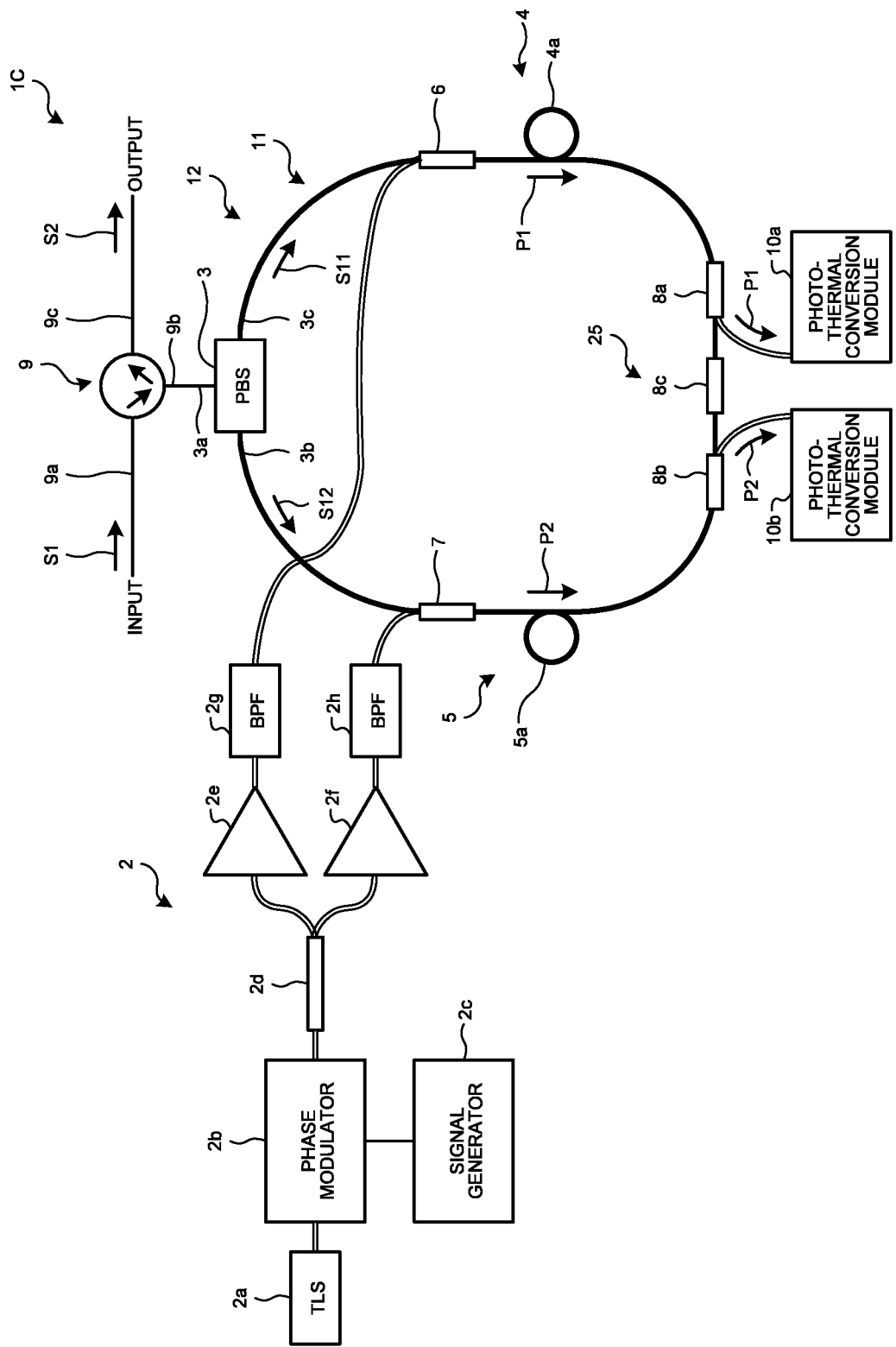
FIG. 4 is a schematic configuration diagram of an optical amplifier according to a fourth embodiment.

FIG. 4 is a schematic configuration diagram of an optical amplifier according to a fourth embodiment. This optical amplifier 1C has a configuration in which the optical discharge unit 8 of the optical amplifier 1 is replaced by an optical discharge unit 25.

The optical discharge unit 25 has a configuration in which an idler light remover 8c is added to the optical discharge unit 8. The idler light remover 8c is placed between the two WDM couplers 8a and 8b of the optical discharge unit 8. The idler light remover 8c includes, for example, a BPF, an LPF, or an SPF and has wavelength characteristics of not transmitting the idler light beam. The idler light remover 8c can have characteristics of transmitting light beams of a wavelength band including the wavelength of the signal light beam S1 and the wavelength of the idler light beam and not transmitting light beams of other wavelength bands. This enables light beams of a predetermined wavelength band including the idler light beam to be removed. That is, the optical discharge unit 25 is configured to discharge the idler light with the pump light beams P1 and P2 to outside the optical loop 11. In this case, only the signal light beam S2 of the wavelength bandwidth to be amplified is amplified and output from the third port 9c of the optical circulator 9 of the optical amplifier 1C. When the wavelength region outside the wavelength bandwidth to be amplified is removed, phenomena that are unwanted in an amplifier and are to be suppressed, such as occurrence of ASE light beams, occurrence of wavelength dependency of the gain of signals on a longer wavelength side due to the Raman effect, and parametric oscillation occurring outside the bandwidth to be amplified can be eliminated. A polarization device (a polarizer, for example) that discharges light beams of polarization components orthogonal to the signal light beams S11 and S12 to outside the optical loop 11 can be alternatively provided instead of the idler light remover 8c.

The polarization device or the idler light remover 8c does not always need to be placed between the two WDM couplers 8a and 8b. As long as being between the two polarization-sensitive optical amplifying fibers 4a and 5a, the polarization device or the idler light remover 8c can achieve effects identical to those described above at any placement position.

Fifth Embodiment

Figure 5:
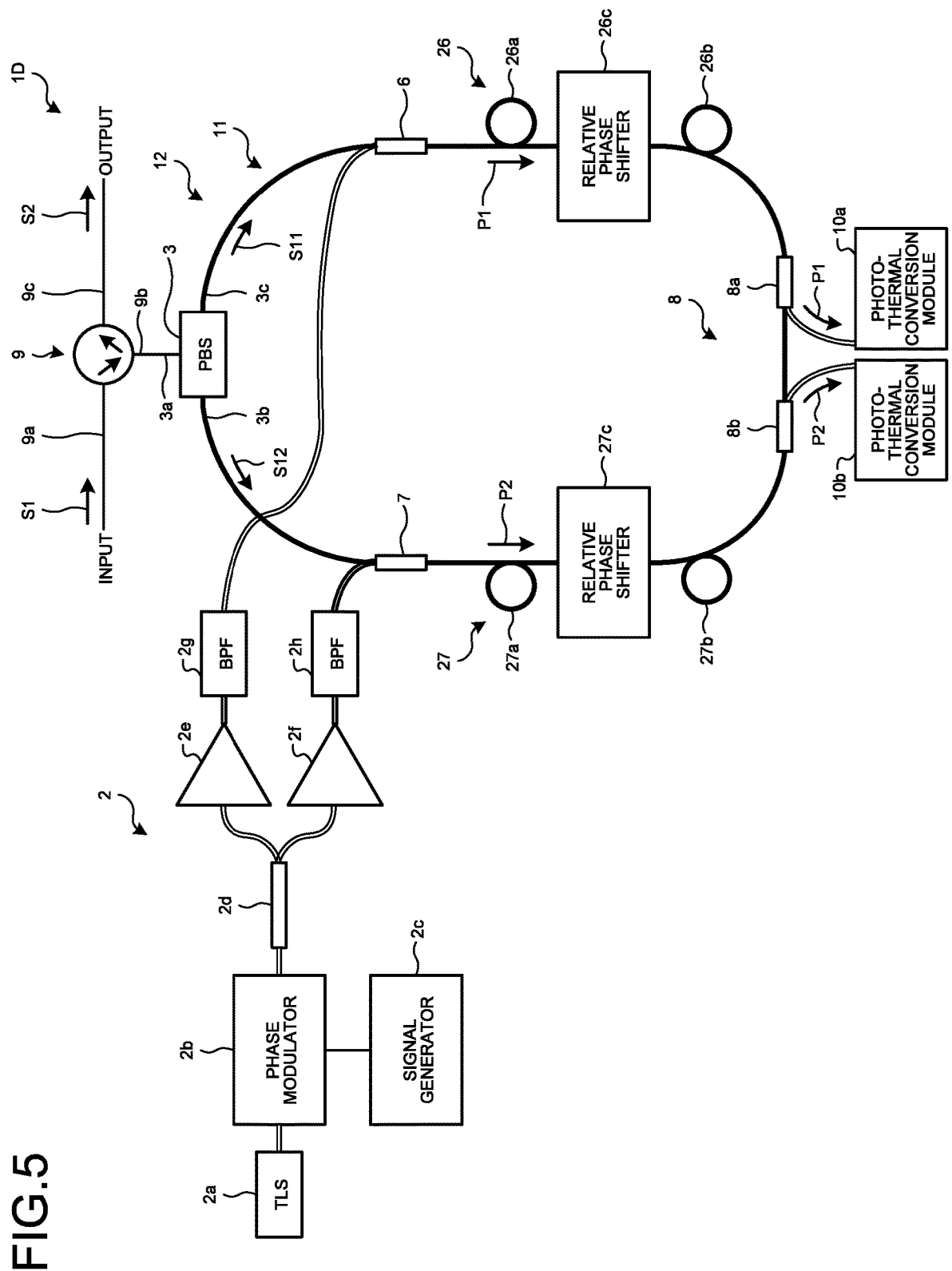
FIG. 5 is a schematic configuration diagram of an optical amplifier according to a fifth embodiment.

FIG. 5 is a schematic configuration diagram of an optical amplifier according to a fifth embodiment. This optical amplifier 1D has a configuration in which the first polarization-sensitive optical amplifying fiber unit 4 and the second polarization-sensitive optical amplifying fiber unit 5 are replaced by a first polarization-sensitive optical amplifying fiber unit 26 and a second polarization-sensitive optical amplifying fiber unit 27, respectively, in the optical amplifier 1.

The first polarization-sensitive optical amplifying fiber unit 26 includes a previous-stage polarization-sensitive optical amplifying fiber 26a, which is a PM-HNLF, a subsequent-stage polarization-sensitive optical amplifying fiber 26b, which is a PM-HNLF, and a relative phase shifter 26c that is inserted between the previous-stage polarization-sensitive optical amplifying fiber 26a and the subsequent-stage polarization-sensitive optical amplifying fiber 26b and that changes a relative phase of an input light beam. The second polarization-sensitive optical amplifying fiber unit 27 includes a previous-stage polarization-sensitive optical amplifying fiber 27a, which is a PM-HNLF, a subsequent-stage polarization-sensitive optical amplifying fiber 27b, which is a PM-HNLF, and a relative phase shifter 27c that is inserted between the previous-stage polarization-sensitive optical amplifying fiber 27a and the subsequent-stage polarization-sensitive optical amplifying fiber 27b and that changes a relative phase of an input light beam.

The relative phase shifters 26c and 27c have characteristics of shifting almost only the phases of the pump light beams P1 and P2, respectively, and hardly shifting the phases of the signal light beams S11 and S12 and a phase conjugate light beam. The use of the relative phase shifters 26c and 27c can realize Quasi-Phase-Matching (QPM) and achieve an increase of the gain and flattening and an increase in the bandwidth of the gain waveform (see International Publication No. WO2012/121223).

As the relative phase shifters 26c and 27c, a PM-FBG, which is manufactured using a PM-HNLF as a base, or a dielectric multilayer all-pass filter having a pig tail which is made of a polarization-maintaining optical fiber or a PM-HNLF may be used. When the PM-FBG is adopted, the gain bandwidth is most broadened and a Bragg wavelength at which a flat gain is obtained is in a range from 5 nm longer than the wavelength of the pump light beam to 5 nm shorter than the wavelength of the pump light beam. Therefore, it is preferable to manufacture the PM-FBG to have the Bragg wavelength within a range from 5 nm longer than to 5 nm shorter than the pump wavelength.

To obtain an increase of the parametric gain and a flat shape, the Bragg wavelength of the PM-FBG constituting the relative phase shifters 26c and 27c is desired to be adjusted. In the FOPA, the power and shape of the ASE light beam and the gain and shape of the FOPA are strongly correlated with each other. Therefore, it is preferable that the Bragg wavelength is adjusted while the spectrum of the ASE light beam is measured, thereby obtaining an increase in the parametric gain and a flat shape. The Bragg wavelength of the PM-FBG can be controlled by the temperature of the PM-FBG and the tension applied to the PM-FBG. A rise of the temperature and an increase of the tension both have an effect to shift the Bragg wavelength of the PM-FBG to a long wavelength side. Therefore, adjustment of the temperature or the tension can be utilized to adjust the Bragg wavelength.

To suppress influences of SBS as much as possible when the QPM is realized, refractive indexes of the core portion or nonlinear constants having characteristics of strongly reflecting the refractive index of the core are to be different from each other in polarization-sensitive optical amplifying fibers to be coupled (the previous-stage polarization-sensitive optical amplifying fiber 26a and the subsequent-stage polarization-sensitive optical amplifying fiber 26b, for example). This can suppress SBS more than in a case where polarization-sensitive optical amplifying fibers having equal refractive indexes of the core portion or equal nonlinear constants are coupled. When the refractive indexes of the core portion are different, the frequencies of the LA are also different, so that occurrence of SBS becomes independent in the polarization-sensitive optical amplifying fibers and the influences of the SBS can be suppressed.

In the fifth embodiment, each of the polarization-sensitive optical amplifying fiber units includes the previous-stage polarization-sensitive optical amplifying fiber, the subsequent-stage polarization-sensitive optical amplifying fiber, and the relative phase shifter inserted therebetween. However, each of the polarization-sensitive optical amplifying fiber units may have a configuration including a plurality of optical amplifying fibers, and relative phase shifters each being inserted between the optical amplifying fibers.

Sixth Embodiment

Figure 6:
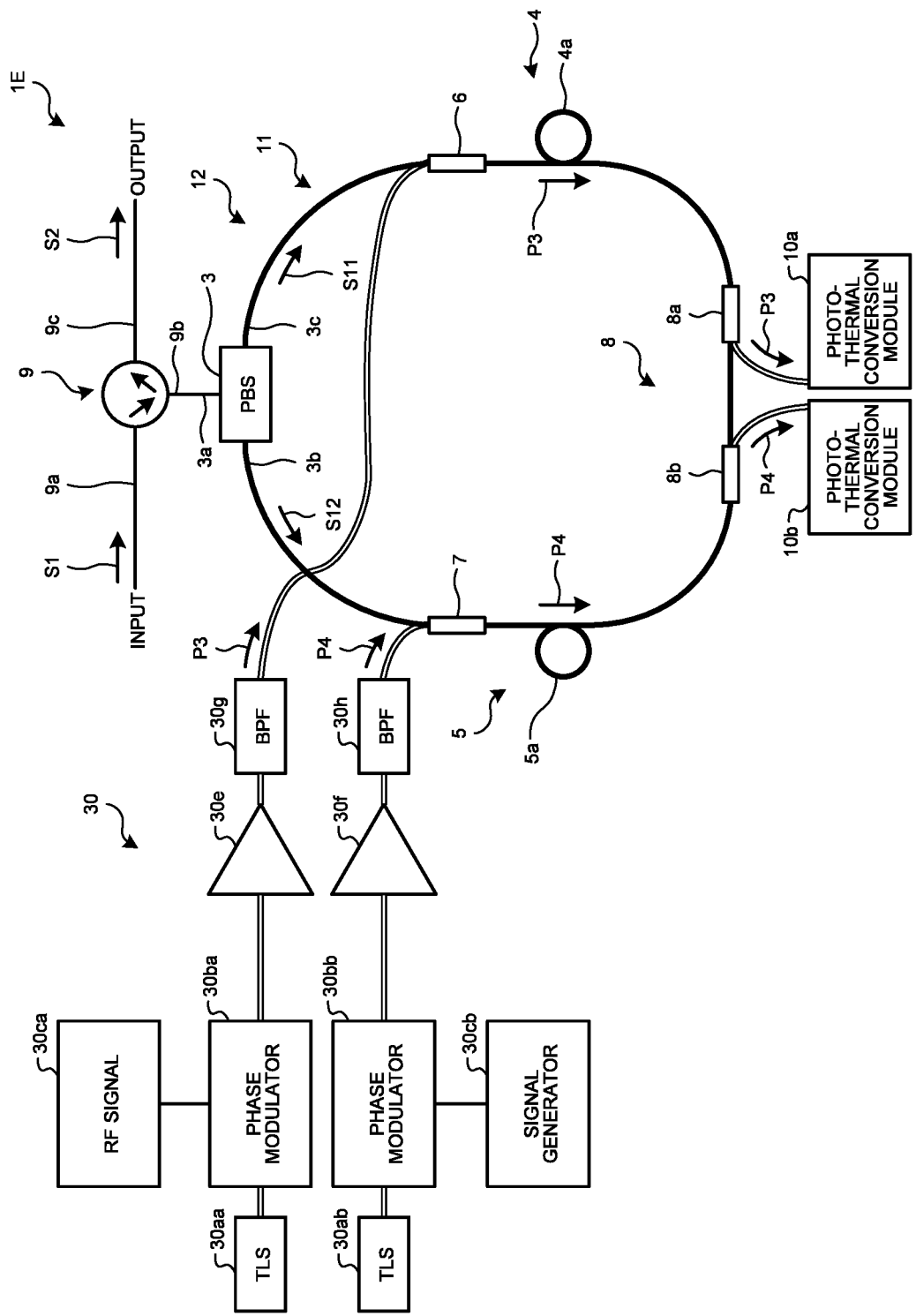
FIG. 6 is a schematic configuration diagram of an optical amplifier according to a sixth embodiment.

FIG. 6 is a schematic configuration diagram of an optical amplifier according to a sixth embodiment. This optical amplifier 1E has a configuration in which the pump-light source unit 2 is replaced by a pump-light source unit 30 in the optical amplifier 1.

The pump-light source unit 30 includes two TLSs 30aa and 30ab serving as pump light sources, phase modulators 30ba and 30bb to modulate phases of CW light beams output from the TLSs 30aa and 30ab, respectively, signal generators 30ca and 30cb to drive the phase modulators 30ba and 30bb, polarization-maintaining optical amplifiers 30e and 30f, and BPFs 30g and 30h.

A linearly-polarized CW light beam output from the TLS 30aa is subjected to phase modulation by the phase modulator 30ba that is driven by an RF signal output from the signal generator 30ca. The CW light beam is then amplified by the polarization-maintaining optical amplifier 30e, unwanted ASE light beams generated in the polarization-maintaining optical amplifier 30e are removed by the BPF 30g, and a resultant light beam is output as a pump light beam P3 having a modulated phase to the WDM coupler 6.

Similarly, a linearly-polarized CW light beam output from the TLS 30ab is subjected to phase modulation by the phase modulator 30bb that is driven by an RF signal output from the signal generator 30cb. The CW light beam is then amplified by the polarization-maintaining optical amplifier 30f, unwanted ASE light beams generated in the polarization-maintaining optical amplifier 30f are removed by the BPF 30h, and a resultant light beam is output as a pump light beam P4 having a modulated phase to the WDM coupler 7.

With this configuration of the optical amplifier 1E, the pump light beams P3 and P4 to be input to the first polarization-sensitive optical amplifying fiber unit 4 and the second polarization-sensitive optical amplifying fiber unit 5, respectively, can be caused to have different wavelengths. When a difference in the wavelengths of the pump light beams P3 and P4 is equal to or greater than the frequency (normally 9 to 11 GHz, which is a light wavelength of approximately 0.1 nm) of the LA causing SBS in the first polarization-sensitive optical amplifying fiber unit 4 and the second polarization-sensitive optical amplifying fiber unit 5, no LA is inductively pumped even when the pump light beams enter the first polarization-sensitive optical amplifying fiber unit 4 and the second polarization-sensitive optical amplifying fiber unit 5 in both directions. Therefore, broadening of the linewidth of the pump light beam or the signal light beam can be avoided. That is, SBS becomes less likely to occur and broadening of the linewidth of the pump light beam or the signal light beam due to SBS can be suppressed even if a pump light beam that has not been removed by the WDM coupler 8a, 8b transmits through the WDM coupler 8a, 8b. It is preferable that the ZDWs of the first polarization-sensitive optical amplifying fiber unit 4 and the second polarization-sensitive optical amplifying fiber unit 5 have been adjusted with respect to the wavelengths of the pump light beams P3 and P4, respectively, so as to provide desired gain characteristics. Therefore, the respective zero dispersion wavelengths can be different from each other.

Seventh Embodiment

Preferably, the placement positions of WDM couplers that multiplex a pump light beam with a signal light beam be between the PBS 3 and the first polarization-sensitive optical amplifying fiber unit 4, and between the PBS3 and the second polarization-sensitive optical amplifying fiber unit 5, respectively, as illustrated in FIG. 1. Each time the pump light beam transmits an optical device, the power thereof is decreased by approximately 0.5 dB as a typical value. Therefore, to minimize the loss of the pump light beam, it is preferable to thus place the WDM couplers immediately before the first polarization-sensitive optical amplifying fiber unit 4 and the second polarization-sensitive optical amplifying fiber unit 5, respectively.

However, in a viewpoint of reducing the number of components, the placement position of a WDM coupler that multiplexes a pump light beam with a signal light beam may be at a previous stage of the PBS 3, for example, at a previous stage of the optical circulator 9 (on the side of the first port 9a of the optical circulator 9) or may be between the optical circulator 9 and the PBS 3.

Figure 7:
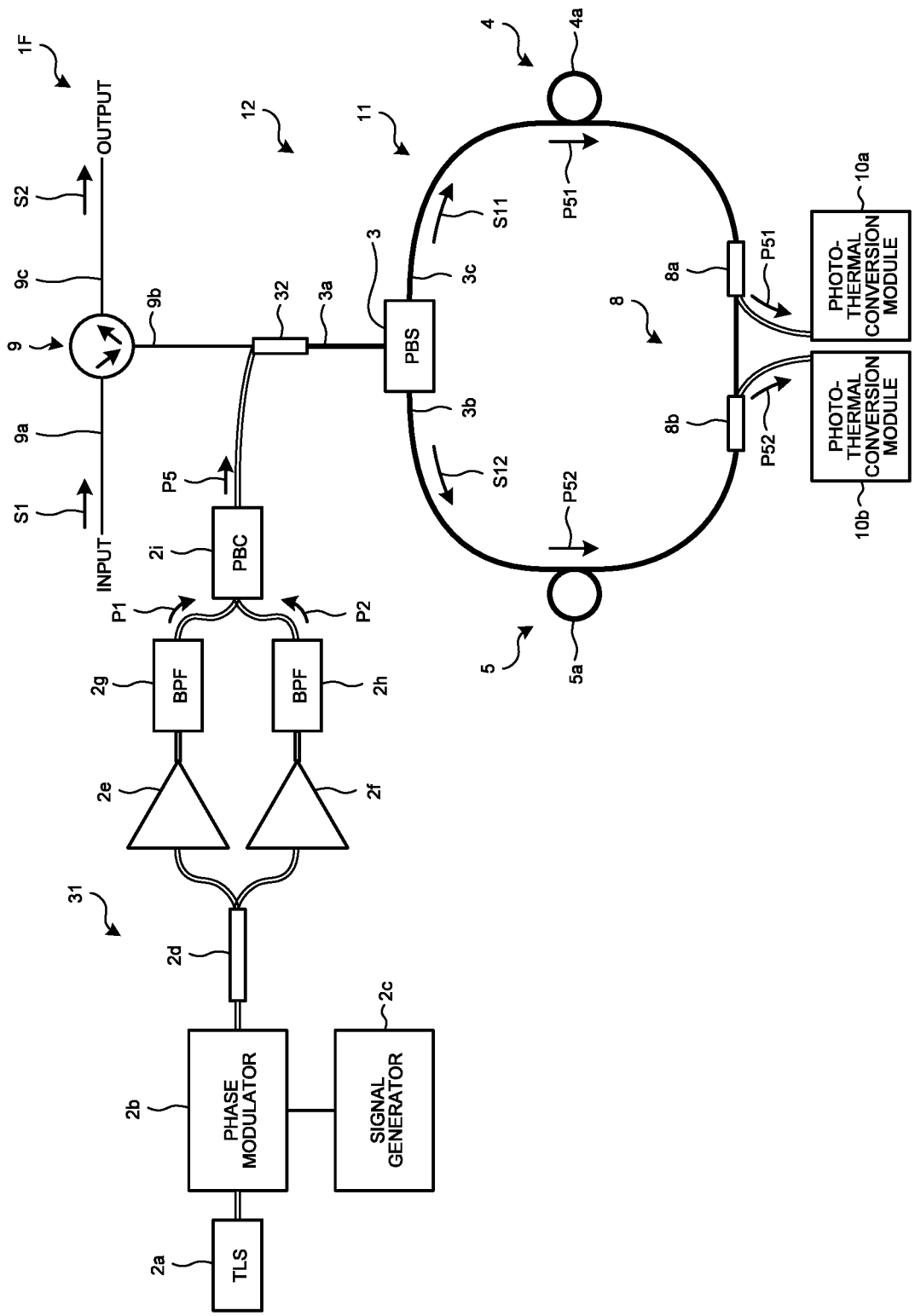
FIG. 7 is a schematic configuration diagram of an optical amplifier according to a seventh embodiment.

FIG. 7 is a schematic configuration diagram of an optical amplifier according to a seventh embodiment. This optical amplifier 1F has a configuration in which the pump-light source unit 2 is replaced by a pump-light source unit 31, the WDM couplers 6 and 7 are removed, and a WDM coupler 32 to which a pump light beam is input is provided between the second port 9b of the optical circulator 9 and the first port 3a of the PBS 3 in the optical amplifier 1.

The pump-light source unit 31 has a configuration in which a polarization multiplexer (Polarization Beam Combiner (PBC)) 2i is added at a subsequent stage of the BPFs 2g and 2h in the pump-light source unit 2. The PBC 2i performs polarization combination of the pump light beams P1 and P2 output from the BPFs 2g and 2h, respectively, as polarization components orthogonal to each other to output a resultant light beam as a pump light beam P5 to the WDM coupler 32. The WDM coupler 32 outputs the input pump light beam P5 to the first port 3a of the PBS 3. An optical fiber constituting a port of the WDM coupler 32 and connected to the first port 3a of the PBS 3 is preferably a polarization-maintaining optical fiber to enable the pump light beams P1 and P2, which are the orthogonal polarization components of the pump light beam P5, to be propagated independently.

The pump light beam P5 input to the PBS 3 is subjected to polarization splitting and resultant components are input as pump light beams P51 and P52 to the first polarization-sensitive optical amplifying fiber unit 4 and the second polarization-sensitive optical amplifying fiber unit 5, respectively. The direction of polarization of the pump light beam P51 and the direction of polarization of the signal light beam S11 are the same, and the direction of polarization of the pump light beam P52 and the direction of polarization of the signal light beam S12 are the same. The pump light beams P51 and P52 are discharged by the WDM couplers 8a and 8b, respectively, of the optical discharge unit 8 to outside the optical loop 11.

Eighth Embodiment

Figure 8:
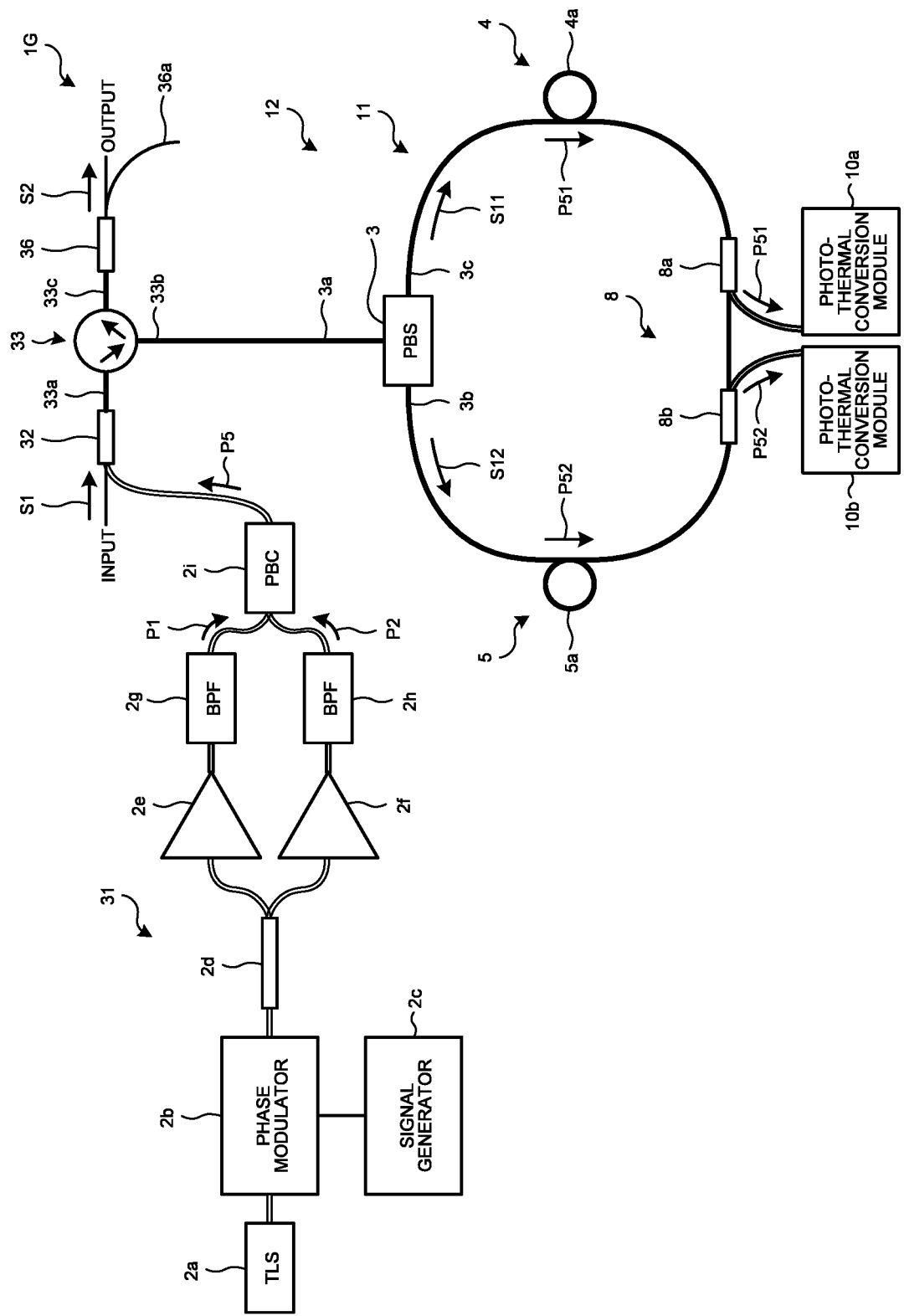
FIG. 8 is a schematic configuration diagram of an optical amplifier according to an eighth embodiment.

FIG. 8 is a schematic configuration diagram of an optical amplifier according to an eighth embodiment. This optical amplifier 1G has a configuration in which the optical circulator 9 is replaced by an optical circulator 33 including a first port 33a, a second port 33b, and a third port 33c, the WDM coupler 32 is placed on the side of the first port 33a of the optical circulator 33, and a WDM coupler 36 is added in the optical amplifier 1F. The first port 33a, the second port 33b, and the third port 33c of the optical circulator 33 are all constituted of a polarization-maintaining fiber. The WDM coupler 36 is connected to the third port 33c of the optical circulator 33. When parts of the pump light beams, not having been removed by the WDM couplers 8a and 8b, transmit through the WDM couplers 8a and 8b, these parts of the pump light beams are discharged from a port 36a of the WDM coupler 36.

To enable light beams (the signal light beams S11 and S12) polarization-split by the PBS 3 to be polarization-combined by the PBS 3 in a state where the phases are aligned, it is preferable that a length (a first length) of a combination of the length of the polarization-maintaining optical fiber of the first port 33a of the optical circulator 33 and the length of a polarization-maintaining optical fiber of the WDM coupler 32 constituting a port connected to the first port 33a be equal to a length (a second length) of a combination of the length of the polarization-maintaining optical fiber of the third port 33c of the optical circulator 33 and the length of a polarization-maintaining optical fiber of the WDM coupler 36 constituting a port connected to the third port 33c within an error range of plus or minus 1 meter. The reason is as follows. For example, a part of the signal light beam S1 propagates through the slow axis of a polarization-maintaining optical fiber constituting an optical path from the polarization-maintaining optical fiber of the WDM coupler 32 to the PBS 3 to reach the PBS 3. After then having propagated through the optical loop 11, the signal light beam converted to propagate through a fast axis propagates through the fast axis of a polarization-maintaining optical fiber constituting an optical path from the PBS 3 to a polarization-maintaining optical fiber of the optical circulator 33 on the side of the third port 33c. Meanwhile, a polarization axis through which a signal light element of the signal light beam S1, split to the fast axis by the polarization-maintaining optical fiber of the WDM coupler 32, propagates is opposite thereto. When the distances of propagation of the signal light beams propagating through these polarization axes are the same, the phase relations between the polarization components of the input signal light beam S1 and those of the output signal light beam S2 completely agree in principle. If the distances of the propagation are different, the phase relations deviate. Accordingly, it is preferable to equalize the first length and the second length as much as possible. A configuration in which the WDM coupler 36 in the present embodiment is omitted can be used. In this configuration, the second length is the length of the polarization-maintaining optical fiber of the third port 33c of the optical circulator 33. Also in this case, it is preferable to equalize the first length and the second length as much as possible.

When the power levels of the pump light beams P1 and P2 output from the polarization-maintaining optical amplifiers 2e and 2f, respectively, are adjusted, the adjustment of the polarization-sensitive gain of the optical amplifier 1G can be performed by adjustment of the parametric gains in the polarization axes through which the pump light beam and the signal light beam propagate in the first polarization-sensitive optical amplifying fiber unit 4 and the second polarization-sensitive optical amplifying fiber unit 5.

Ninth Embodiment to Eleventh Embodiment

In each of the embodiments described above, the number of the polarization-maintaining optical amplifiers in the pump-light source unit is two. When one polarization-maintaining optical amplifier is provided in the pump-light source unit, it may be advantageous in the cost although the pump light beam output from the used polarization-maintaining optical amplifier requires power more than twice as large as that in the case of two polarization-maintaining optical amplifiers.

Figure 9:
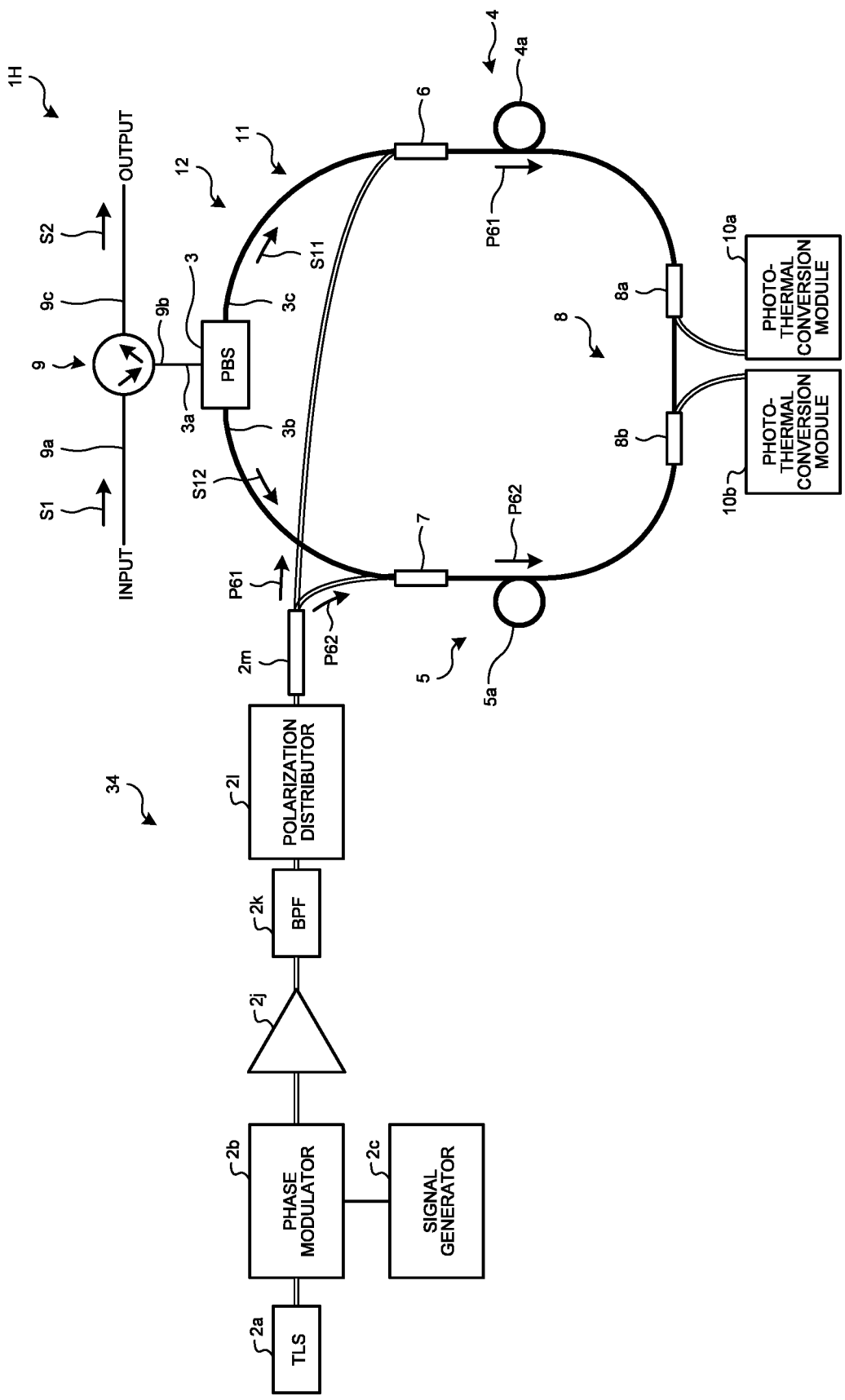
FIG. 9 is a schematic configuration diagram of an optical amplifier according to a ninth embodiment.

FIG. 9 is a schematic configuration diagram of an optical amplifier according to a ninth embodiment. This optical amplifier 1H has a configuration in which the pump-light source unit 2 is replaced by a pump-light source unit 34 in the optical amplifier 1. The pump-light source unit 34 has a configuration in which the polarization-maintaining 3 dB coupler 2d is removed, the two polarization-maintaining optical amplifiers 2e and 2f and the two BPFs 2g and 2h are replaced by a polarization-maintaining optical amplifier 2j, which is one optical fiber amplifier, and a BPF 2k, respectively, and a polarization distributor 21 and a PBS 2m are added to the pump-light source unit 2.

The linearly-polarized CW light beam output and phase-modulated by the phase modulator 2b is amplified by the polarization-maintaining optical amplifier 2j having a higher output than the polarization-maintaining optical amplifiers 2e and 2f, unwanted ASE light beams generated in the polarization-maintaining optical amplifier 2j are removed by the BPF 2k, and a resultant light beam is output as a phase-modulated pump light beam to the polarization distributor 21.

The polarization distributor 21 is constituted, for example, of a half-wavelength plate or a quarter-wavelength plate and inclines the direction of the polarization of the input linearly-polarized pump light beam by 45 degrees or circularly polarizes the pump light beam and outputs a resultant light beam to the PBS 2m. Accordingly, the polarization distributor 21 outputs the pump light beam to the slow axis and the fast axis of a polarization-maintaining optical fiber on an input side of the PBS 2m at almost equal power levels, respectively. The PBS 2m performs polarization splitting of the input pump light beam to be output as pump light beams P61 and P62 with substantially equal power levels, respectively. The pump light beams P61 and P62 are input to the WDM couplers 6 and 7, respectively, then propagate through the first polarization-sensitive optical amplifying fiber unit 4 and the second polarization-sensitive optical amplifying fiber unit 5 to parametrically amplify the signal light beams S11 and S12, and are discharged by the WDM couplers 8a and 8b. By adjusting the distribution ratio of the pump light beam between the slow axis and the fast axis in the polarization distributor 21, the polarization-sensitive gain of the optical amplifier 1H can be reduced.

Instead of the polarization distributor 21 having the configuration described above, a polarization distributor having a configuration in which two polarization-maintaining optical fibers are connected in such a manner that the respective polarization axes form an angle of 45 degrees with a margin of plus or minus 5 degrees and a pump light input to one of the polarization-maintaining optical fibers is output to the slow axis and the fast axis of the other polarization-maintaining optical fiber at almost equal levels of power can be used. Also with this polarization distributor, the polarization-sensitive gain of the optical amplifier 1H can be reduced by adjustment of the distribution ratio of the pump light beam between the slow axis and the fast axis.

Figure 10:
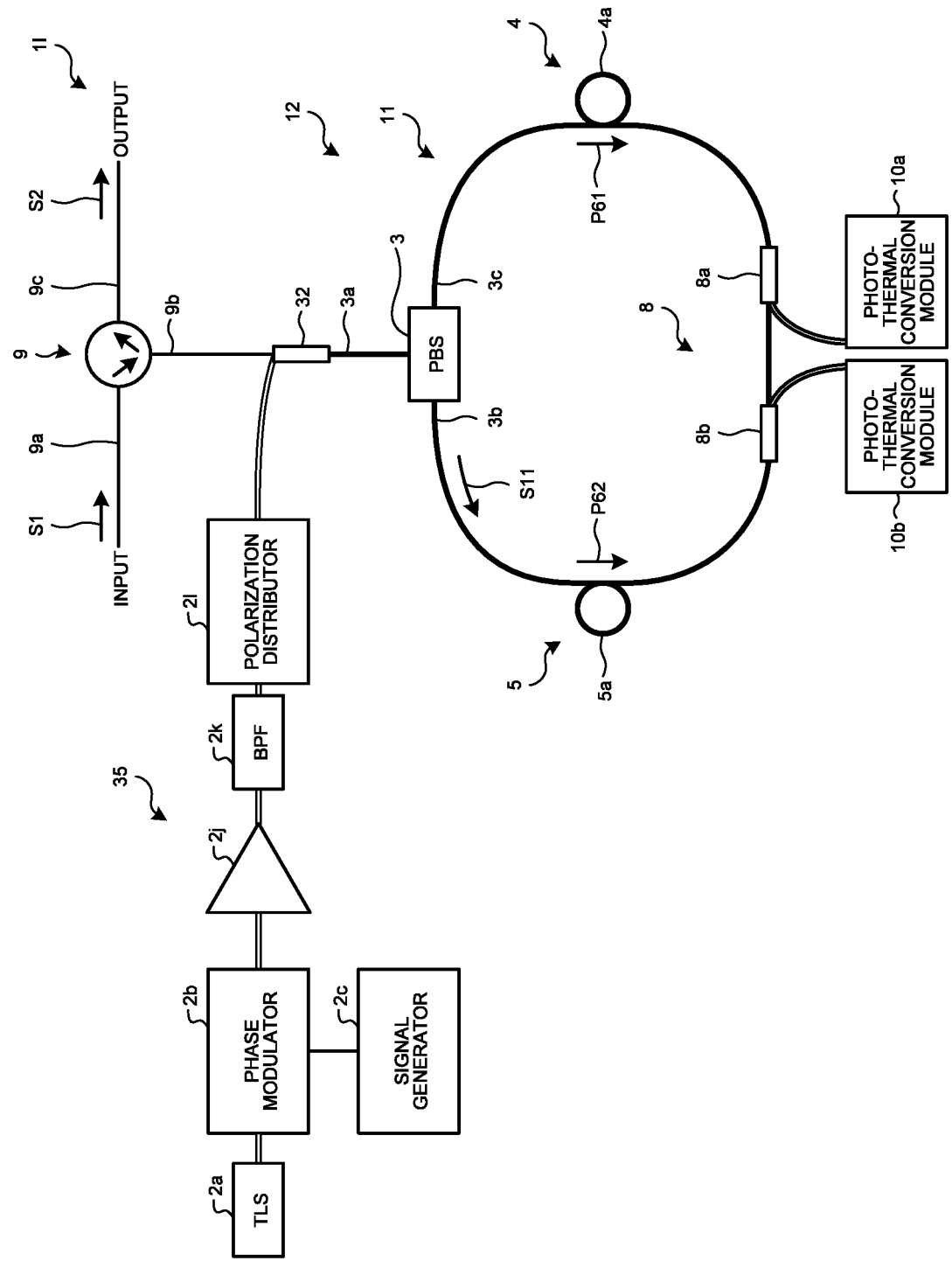
FIG. 10 is a schematic configuration diagram of an optical amplifier according to a tenth embodiment.

FIG. 10 is a schematic configuration diagram of an optical amplifier according to a tenth embodiment. This optical amplifier 1I has a configuration in which the pump-light source unit 31 is replaced by a pump-light source unit 35 in the optical amplifier 1F. The pump-light source unit 35 has a configuration in which the PBS 2m is omitted from the pump-light source unit 34. The polarization distributor 21 adjusts the distribution ratio of the pump light beam between the slow axis and the fast axis, whereby the polarization-sensitive gain of the optical amplifier 1I can be reduced.

Figure 11:
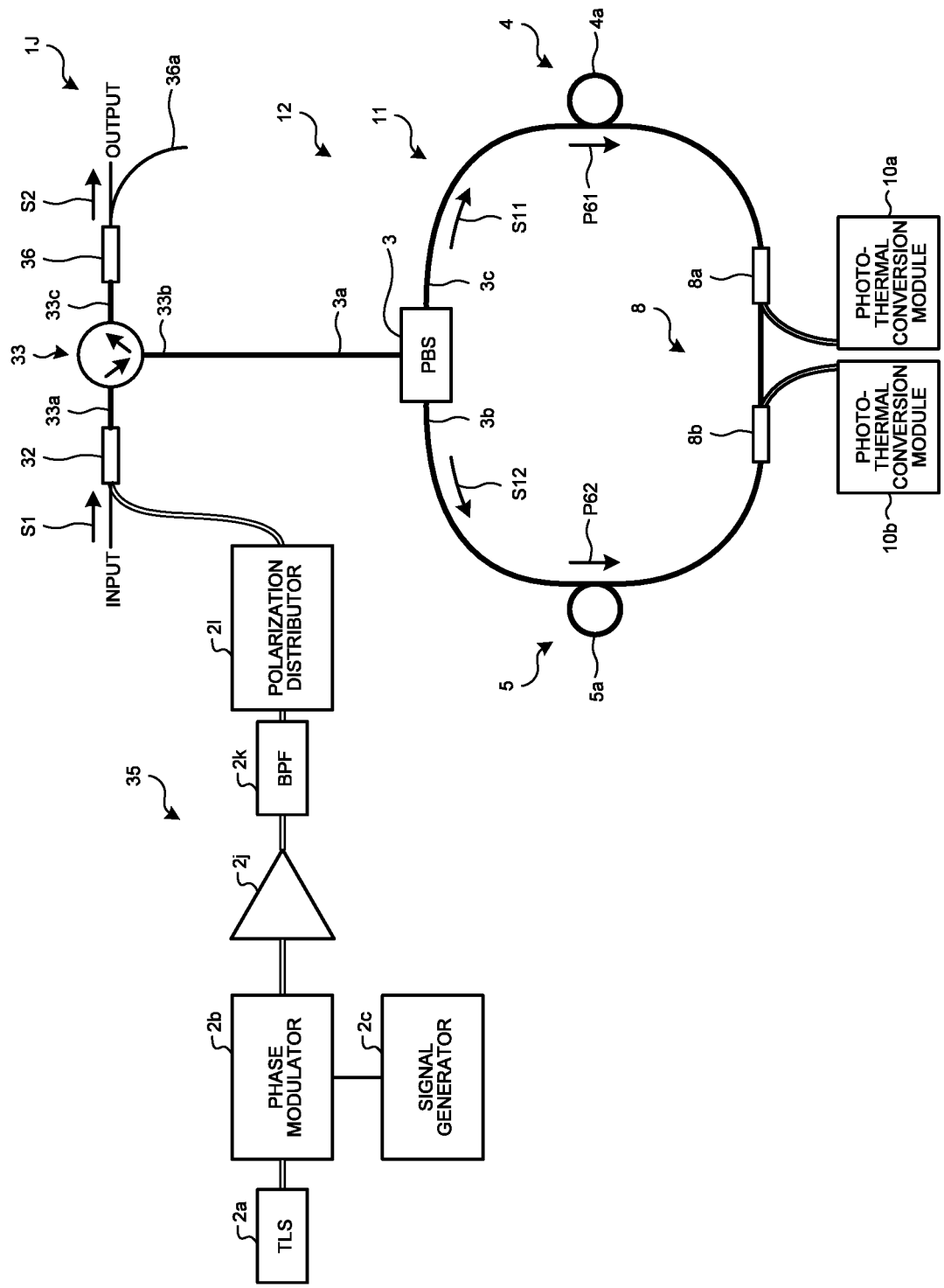
FIG. 11 is a schematic configuration diagram of an optical amplifier according to an eleventh embodiment.

FIG. 11 is a schematic configuration diagram of an optical amplifier according to an eleventh embodiment. This optical amplifier 1J has a configuration in which the pump-light source unit 31 is replaced by the pump-light source unit 35 in the optical amplifier 1G. The polarization distributor 21 adjusts the distribution ratio of the pump light beam between the slow axis and the fast axis, whereby the polarization-sensitive gain of the optical amplifier 1J can be reduced.

According to the tenth and eleventh embodiments, the WDM couplers that multiplex the pump light beam and the signal light beam and the polarization-maintaining optical amplifiers can be removed, so that the number of components can be reduced.

Twelfth Embodiment

Figure 12:
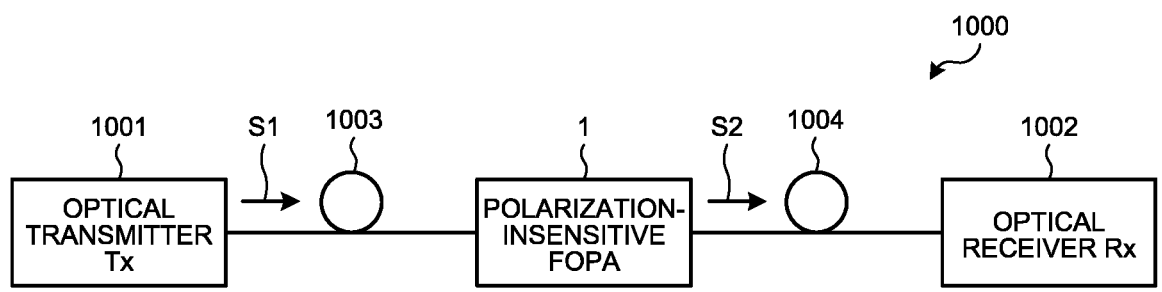
FIG. 12 is a schematic configuration diagram of an optical communication system according to a twelfth embodiment.

FIG. 12 is a schematic configuration diagram of an optical communication system according to a twelfth embodiment.

An optical communication system 1000 includes an optical transmitter 1001, an optical receiver 1002, optical transmission fibers 1003 and 1004 that connect the optical transmitter 1001 and the optical receiver 1002, respectively, and the optical amplifier 1 according to the first embodiment.

The optical transmitter 1001 outputs the signal light beam S1, which is a WDM signal light beam to the optical transmission fiber 1003. The optical transmission fiber 1003 transmits the signal light beam S1 to be input to the optical amplifier 1. The optical amplifier 1 parametrically amplifies the signal light beam S1 to be output as the signal light beam S2. The optical transmission fiber 1004 transmits the signal light beam S2 to be input to the optical receiver 1002. The optical receiver 1002 receives the signal light beam S2. Because the optical communication system 1000 includes the optical amplifier 1 in which the spectrum width of the signal light beam S2 is suppressed from being broadened, high-quality signal transmission can be achieved.

Example

Figure 13:
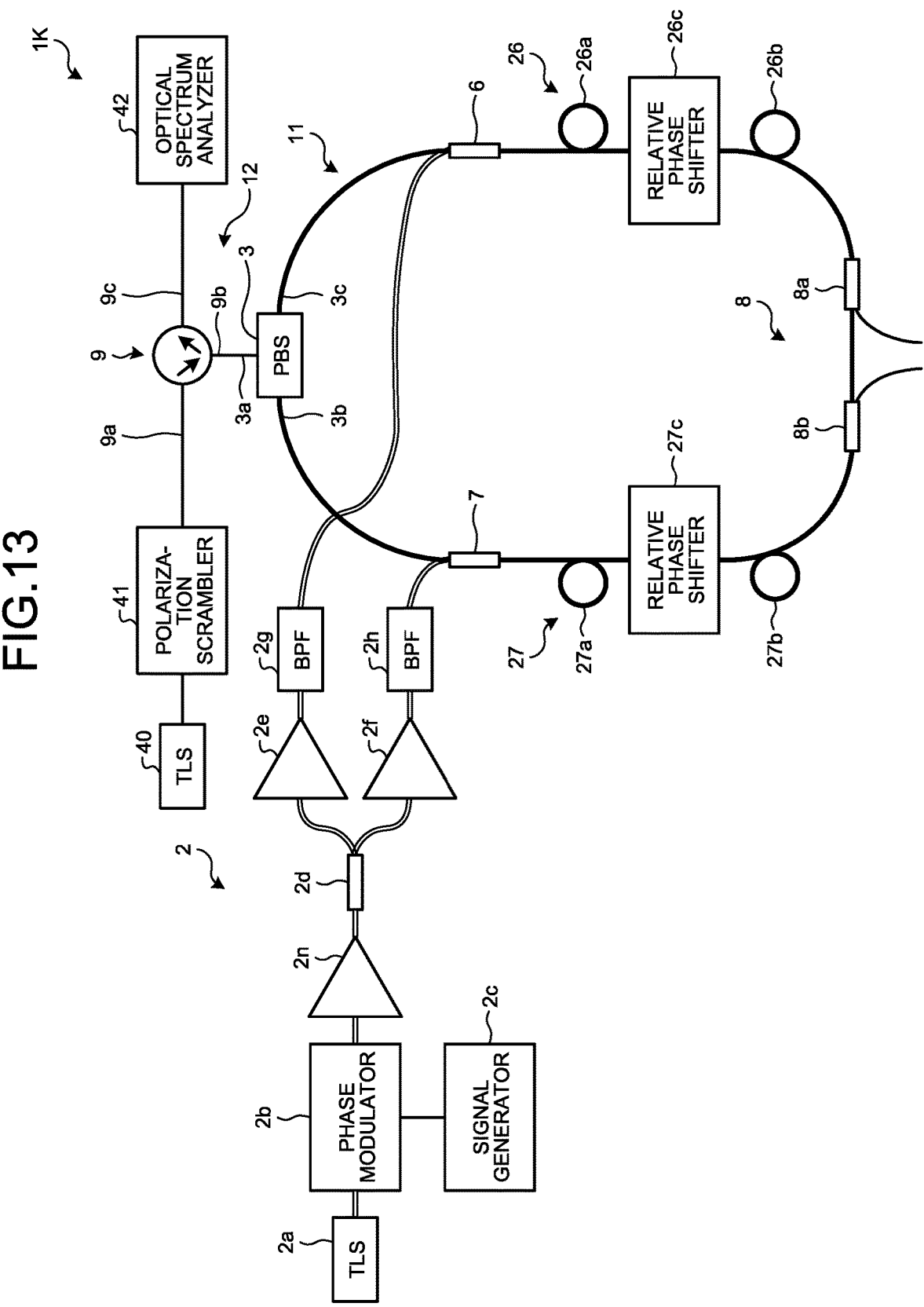
FIG. 13 is a schematic configuration diagram of an optical amplifier used in an experiment.

As an example of the present disclosure, an optical amplifier 1K with a configuration illustrated in FIG. 13 was manufactured and characteristics thereof were measured. The optical amplifier 1K has the configuration of the optical amplifier 1D as illustrated in FIG. 5, in which a polarization-maintaining optical amplifier 2n is added as a preamplifier between the phase modulator 2b and the polarization-maintaining 3 dB coupler 2d in the pump-light source unit 2 and a white noise signal source having a bandwidth of 1.2 GHz is used as the signal generator 2c. To measure the gain, the NF, and the polarization-sensitive characteristics of the optical amplifier 1K, a TLS 40 for generating the signal light beam S1, which is a CW light beam, and a polarization scrambler 41 that scrambles the polarization state of the signal light beam S1 input from the TLS 40 were cascade-connected and connected to the first port 9a of the optical circulator 9, and an optical spectrum analyzer 42 was connected to the third port 9c of the optical circulator 9.

The wavelength, the power, and the linewidth of the CW light beam output from the TLS 2a were set to 1564.9 nm, 6 dBm, and approximately 100 kHz, respectively. The phase modulator 2b modulated the phase of the CW light beam and broadened the 3d spectrum width by approximately 5 GHz. The polarization-maintaining optical amplifier 2n optically amplified the CW light beam to have power of 20 dBm. The CW light beam was then split into two by the polarization-maintaining 3 dB coupler 2d and was amplified by the polarization-maintaining optical amplifiers 2e and 2f, respectively, to have power of 35 dBm. The full width at half maximum of the transmission bandwidth of the BPFs 2g and 2h was set to 0.6 nm. A micro-optics device that transmits light beams in a wavelength range of 1564 nm to 1578 nm and reflects light beams of other wavelengths was used as the WDM couplers 6 and 7. While the WDM couplers 6 and 7 having a wide transmission wavelength range were used in the present embodiment to perform experiments in various pump wavelengths, it is preferable to apply, for example, a WDM coupler having such transmission characteristics that the center wavelength is 1564.9 nm and the bandwidth is 0.4 nm to set the wavelength range in which unwanted ASE light beams are removed or the signal light beam can be amplified to a wide bandwidth.

PM-HNLFs #1 to #4 were used as the previous-stage polarization-sensitive optical amplifying fibers 26a and 27a and the subsequent-stage polarization-sensitive optical amplifying fibers 26b and 27b, respectively, and PM-FBGs were applied as the relative phase shifters 26c and 27c, respectively. Characteristics of the PM-HNLFs #1 and #2 are indicated in Table 1 and characteristics of the PM-HNLFs #3 and #4 are indicated in Table 2.

TABLE 1

| Table Characteristics of PM-HNLF #1, #2 | | |
|---|---|---|
| items | Units | Values |
| Length | m | 100 |
| attenuation | dB/km | 1.2 |
| Nonlinear coefficient | 1/W/km | 18.8 |
| Dispersion slow axis@1550 nm | ps/nm/km | −0.54 |
| Disp.slope slow axis@1550 nm | ps/nm$^2$/km | 0.036 |
| Zero disp.Wavelength slow axis | nm | 1564.9 |

TABLE 2

| Table Characteristics of PM-HNLF #3, #4 | | |
|---|---|---|
| items | Units | Values |
| Length | m | 200 |
| attenuation | dB/km | 0.47 |
| Nonlinear coefficient | 1/W/km | 11 |
| Dispersion slow axis@1550 nm | ps/nm/km | −0.9 |
| Disp.slope slow axis@1550 nm | ps/nm$^2$/km | 0.063 |
| Zero disp.Wavelength slow axis | nm | 1564.9 |

The ZDWs of the PM-HNLFs #1 to #4 were all 1564.9 nm. Application of a PM-HNLF having the same ZDW as the wavelength of the pump light beam enables the maximum gain bandwidth of the PM-HNLF to be used and flattens most the gain shape. The nonlinear coefficient of the PM-HNLFs #1 and #2 is 21 [1/W/km], and the nonlinear coefficient of the PM-HNLFs #3 and #4 is 12 [1/W/km], which are greatly different from each other. This suggests that the refractive index of the core portion greatly differs between the PM-HNLFs #1 and #2 and the PM-HNLFs #3 and #4 and it is estimated that the frequencies of the LA pumped by SBS are different by 20 MHz or more. When the frequencies of the LA are different by 20 MHz or more, it is considered that a light beam scattered (reflected) by SBS does not contribute to inductively pump the LA in another PM-HNLF and thus an SBS threshold assumed from the total fiber length of the PM-HNLFs is increased by approximately 3 dB, which contributes to suppress SBS.

The relative phase shifters 26c and 27c are PM-FBGs, which are made of a PM-HNLF having identical characteristics to those of the PM-HNLF #1 and #2. The Bragg wavelengths thereof were set to 1565.4 nm, which is 0.5 nm longer than 1564.9 nm and which corresponds to the ZDW and the pump wavelength. The 3 db bandwidth of reflected light beams of the PM-FBG is 0.6 nm. Due to a difference between the pump wavelength and the Bragg wavelength, the pump light beam is subjected to an effect of shifting only the phase almost without being reflected when propagating through the PM-FBG. As a result, the PM-FBG acts as a pump phase shifter. By manufacturing the PM-FBG using an optical fiber having identical characteristics to those of the PM-HNLFs #1 and #2, the dispersion effect in the PM-FBG is substantially negligible. Additionally, because the Mode Field Diameters (MFDs) are almost equal to each other, an advantage of almost eliminating fusion splicing loss can be obtained.

As the WDM couplers 8a and 8b, WDM couplers having the same characteristics as those of the WDM couplers 6 and 7 were used. Optical fibers of ports that discard the pump light beam in the WDM couplers 8a and 8b were wound approximately ten times with a diameter of approximately 15 millimeters and were fixed to a heat sink coated with grease. Facets of the optical fibers were diagonally cut to prevent facet reflection.

As for the signal light beam S2 output from the optical circulator 9, polarization fluctuations of power of the signal light beam S2 were measured by the optical spectrum analyzer 42, a separately-prepared optical receiver, and an oscilloscope to measure the degree of a polarization-sensitive gain difference.

A fact that considerable broadening of the linewidth of the pump light beam does not occur with the optical amplifier 1K having the configuration as illustrated in FIG. 13 was confirmed by measuring the optical spectrum using the optical spectrum analyzer 42. The wavelength of the pump light beam was set to 1564.7 nm and the pump light power input to the previous-stage polarization-sensitive optical amplifying fibers 26a and 27a (the PM-HNLFs #1 and #2) was set to approximately 33 dBm.

Figure 14:
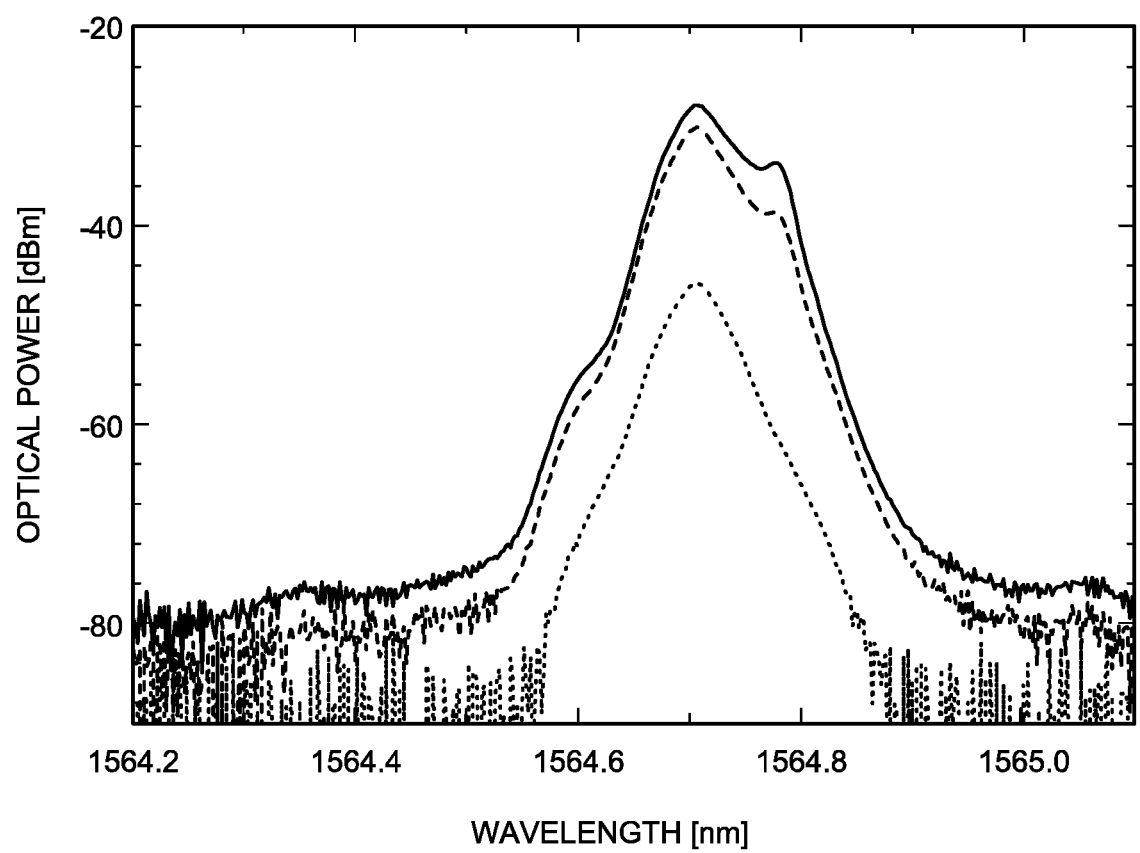
FIG. 14 is a diagram illustrating spectra of pump light beams.

FIG. 14 is a diagram illustrating spectra of pump light beams. A dotted line represents an optical spectrum at input portions of the polarization-maintaining optical amplifiers 2e and 2f (the PM-EDFAs #2 and #3) at a time when only the polarization-maintaining optical amplifier 2n (the PM-EDFA #1) is operated. A broken line represents an optical spectrum at a time when the PM-EDFAs #1 and #3 are operated and only the clockwise pump light beam propagates through the optical loop 11. A peak suggesting occurrence of SBS is generated at 1564.8 nm, which is less than the peak power at 1564.7 nm by approximately 10 dB. A solid line represents an optical spectrum at a time when the PM-EDFAs #1, #2, and #3 are operated and the pump light beams propagate through the optical loop 1 both clockwise and counter-clockwise. It is understood that there is no spectrum width broadening in the pump light beam as illustrated in FIG. 20, SBS is not considerably increased due to propagation in the both directions while slightly increased, and the spectrum has a substantially similar linewidth to that of the optical spectrum represented by the dotted line. That is, it was confirmed that application of the configuration illustrated in FIG. 13 prevented considerable broadening of the optical spectrum width as illustrated in FIG. 20 even when the polarization diversity configuration was adopted and the input power of the pump light beam to the PM-HNLFs was as large as 33 dBm.

Figure 15:
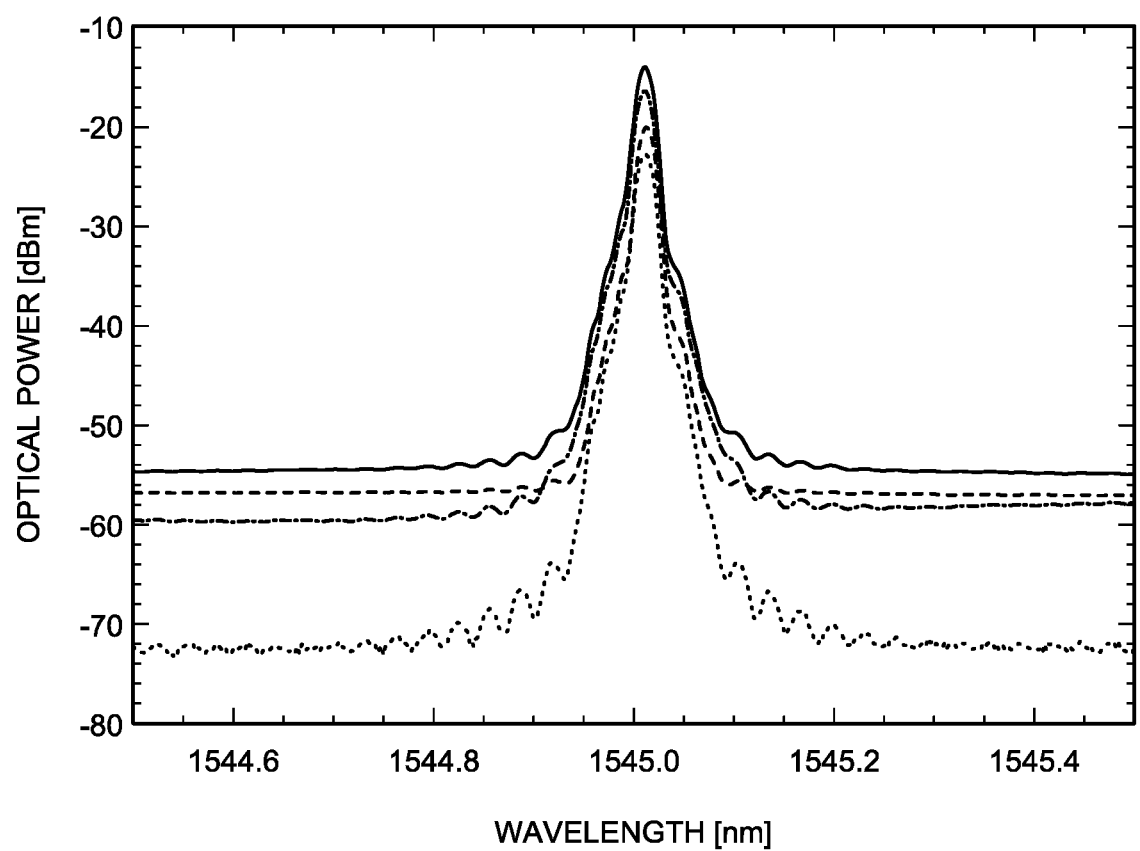
FIG. 15 is a diagram illustrating spectra of amplified signal light beams.

FIG. 15 is a diagram illustrating spectra of amplified signal light beams. The measurement indicates changes of optical spectra according to states of the pump light beam at a time when a CW light beam with a wavelength of 1545 nm is input as the signal light beam S1 that is output from the TLS 40 in a state where the polarization scrambler 41 is stopped. A dotted line represents an optical spectrum at a time when no pump light beam is input. This optical spectrum reflects the optical spectrum of the CW light beam itself output from the TLS 40. A broken line and a dashed-dotted line represent optical spectra at a time when only a clockwise pump light beam is propagated and a time when only a counter-clockwise pump light beam is propagated, respectively. These optical spectra have shapes substantially identical to that represented by the dotted line except that a floor is extended due to ASE light beams. A solid line represents an optical spectrum at a time when the PM-EDFAs #1, #2, and #3 are operated and the pump light beam is propagated both clockwise and counter-clockwise. This spectrum also has a shape substantially identical to that represented by the dotted line except that a floor is extended due to ASE light beams. That is, it was confirmed that the linewidth of the amplified signal light beam was not significantly broadened even when the polarization diversity configuration was adopted and the input power of the pump light beam to the PM-HNLFs was as large as 33 dBm.

Figure 16:
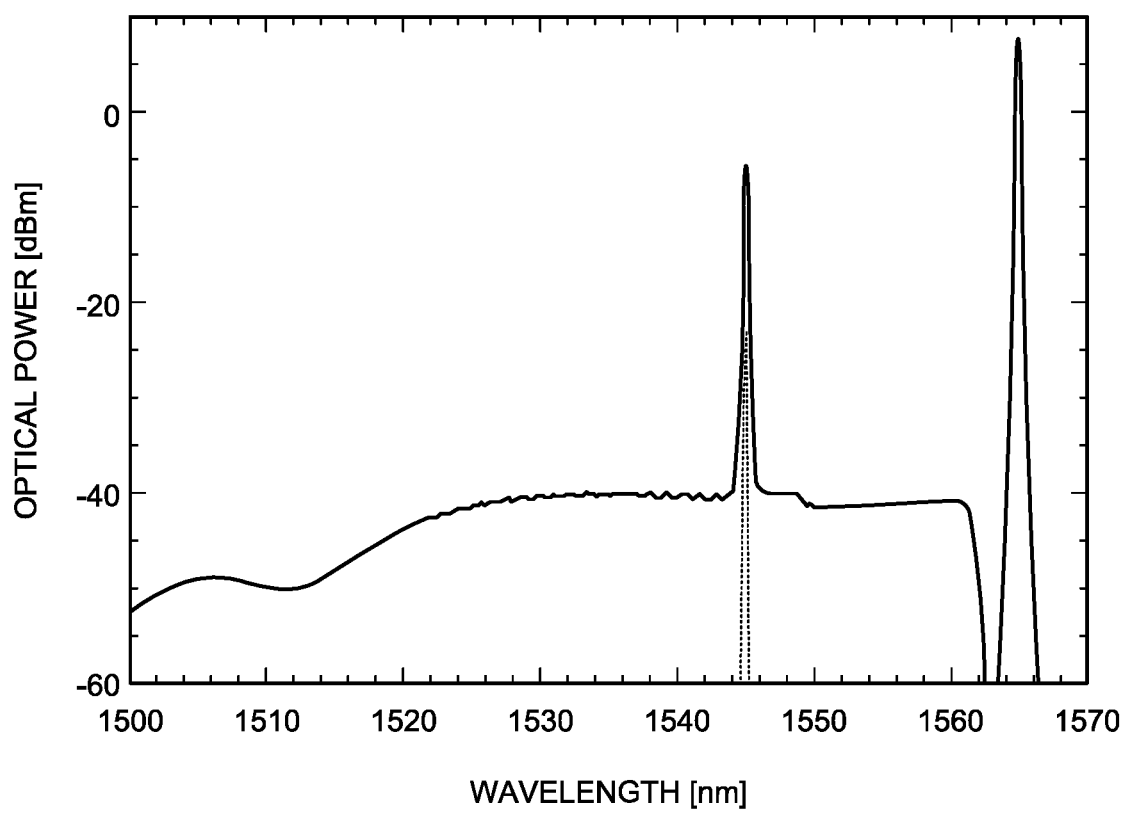
FIG. 16 is a diagram illustrating spectra of a pump light and a signal light beam.

FIG. 16 is a diagram illustrating spectra of a pump light beam and a signal light beam. A CW light beam with a wavelength of 1545 nm was input as the signal light beam S1. A dotted line represents an optical spectrum at a time when there is no pump light beam. A solid line represents an optical spectrum at a time when a pump light beam is input. It is understood that the CW light beam with the wavelength of 1545 nm, which is the signal light beam S1, is amplified with a gain of approximately 18 dB. It is also understood that a bandwidth, in which the light beam can be flatly amplified, is substantially 35 nm because the floor of ASE light beams is substantially flat from 1525 nm to 1560 nm. A pump light beam with a wavelength of 1564.7 nm is a residual pump light beam having passed through the WDM couplers 8a and 8b.

Next, it was confirmed that a reduction of the polarization-sensitive gain difference in the adjustment of the pump light power or a reduction of the wavelength difference between the ZDW and the wavelength of the pump light beam and the polarization-sensitive gain waveform difference in adjustment of the Bragg wavelength of the PM-FBG was able to be realized.

Figure 17:
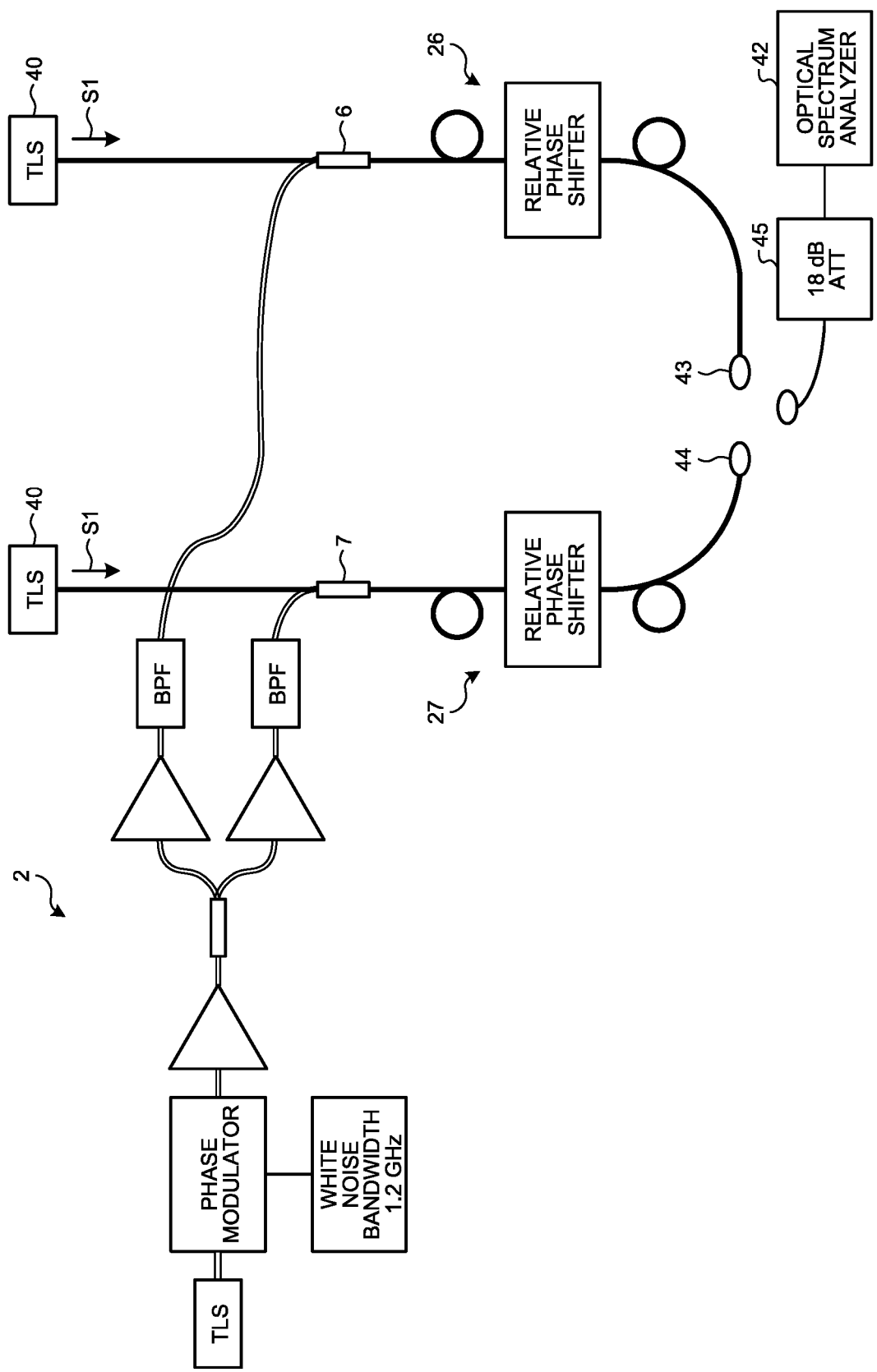
FIG. 17 is a schematic configuration diagram of an experimental system used in an experiment.

The wavelength of the pump wavelength was set to 1564.9 nm, the pump power input to the PM-HNLFs #1 and #2 was set to 33 dBm, and the parametric amplification characteristics on the right side in the drawing of the polarization diversity loop and the left side thereof were independently measured. The configuration of an experimental system used in this experiment is illustrated in FIG. 17. The experimental system has a configuration in which the optical circulator 9 and the PBS 3 are removed from the optical amplifier 1K, and inputs CW light beams (the signal light beams S1) output from the TLSs 40 and 40 directly to signal-light input ports of the WDM couplers 6 and 7, respectively. Furthermore, the optical discharge unit 8 is omitted, optical connectors 43 and 44 are provided on terminal ends of the polarization-sensitive optical amplifying fiber units 26 and 27, respectively, and the optical connector on the terminal end of one of the wave-sensitive optical amplifying fiber units whose gain characteristics are to be measured is connected to a 18 dB Attenuator (ATT) 45. An output light beam of the 18 dB ATT 45 was measured by the optical spectrum analyzer 42.

Figure 18:
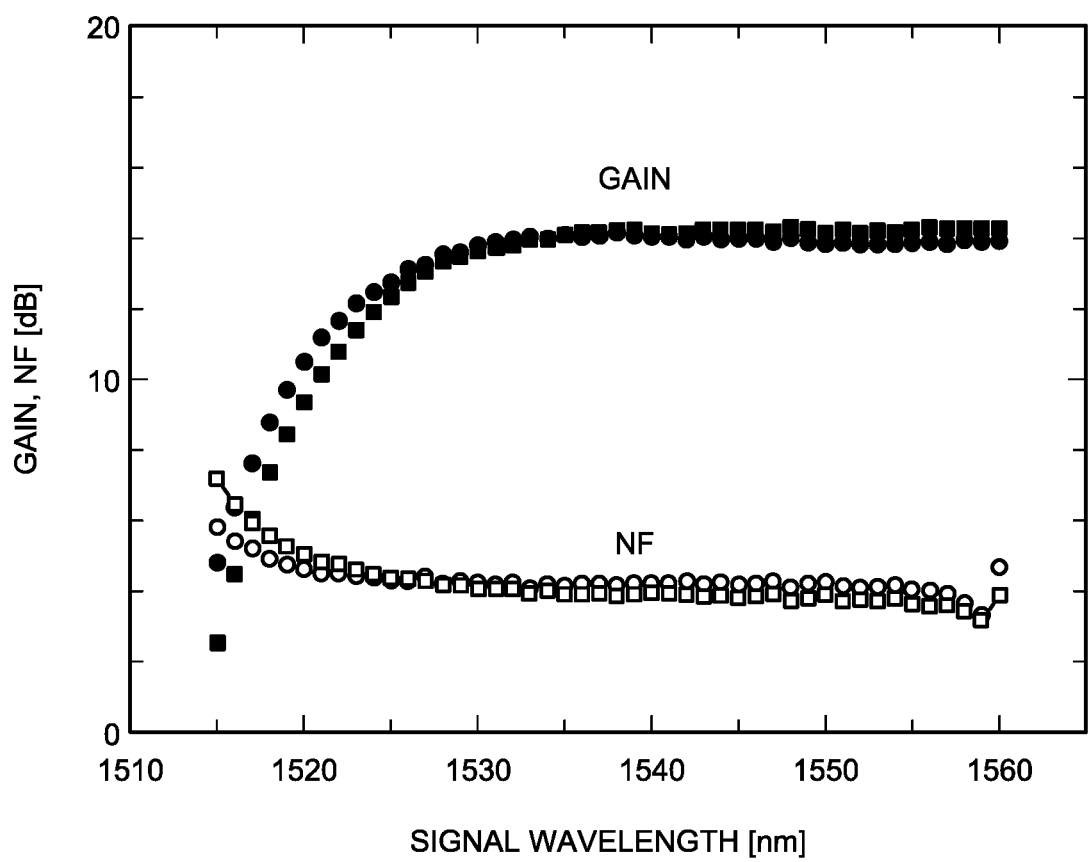
FIG. 18 is a diagram illustrating wavelength dependence of a gain and an NF.

To adjust the power of the pump light beam to reduce the polarization-sensitive gain difference, the power and waveform of the ASE light spectrum were continuously measured by the optical spectrum analyzer 42 without the signal light beam S1 being input. After the ASE spectrum output from the first polarization-sensitive optical amplifying fiber unit 26 on the right side in the drawing and the ASE spectrum output from the second polarization-sensitive optical amplifying fiber unit 27 on the left side in the drawing were set to be substantially equal, the gains and NFs of the polarization-sensitive optical amplifying fiber units 26 and 27 were measured. FIG. 18 is a diagram illustrating wavelength dependence of the gain and the NF. Circular symbols in FIG. 18 represent amplification characteristics of the first polarization-sensitive optical amplifying fiber unit 26 and rectangular symbols represent amplification characteristics of the second polarization-sensitive optical amplifying fiber unit 27. It was confirmed that the polarization-sensitive gain difference and the polarization-sensitive waveform difference between the first polarization-sensitive optical amplifying fiber unit 26 and the second polarization-sensitive optical amplifying fiber unit 27 were both less than 0.5 dB in a wavelength range from 1525 nm to 1560 nm. Therefore, when the measurement condition of this experimental system is applied to the optical amplifier 1K illustrated in FIG. 13, both the polarization-sensitive gain difference and the polarization-sensitive waveform difference can be estimated to be less than 0.5 dB.

In the optical communication system 1000, the optical amplifier 1 is provided as an optical amplifier. However, any of the optical amplifiers according to the embodiments described above may be provided instead of the optical amplifier 1.

The optical amplifiers according to the embodiments described above may be operated as a wavelength converter.

One of the optical amplifiers according to the embodiments described above may be installed at a previous stage of an EDFA or at a subsequent stage of an optical amplification system using the Raman effect to constitute the optical amplification system.

The optical amplifiers according to the embodiments described above may be also used as a Phase Sensitive Amplifier (PSA).

The present disclosure is not limited to the embodiments described above. Configurations achieved by combining the respective elements described above are also included in the present disclosure. Additional effects and modifications will readily occur to those skilled in the art. Therefore, the present disclosure in its broader aspects is not limited to the embodiments described above and various changes can be made.

As described above, the present disclosure is suitably applied to the field of optical communication.

According to the present disclosure, there is an effect where broadening of the spectrum width of a pump light beam or the spectrum width of an amplified signal light beam is suppressed.

The invention claimed is:

1. An optical amplifier comprising:
a pump-light source unit configured to output pump light beams having respective phases modulated;
a polarization multiplexer/demultiplexer having first, second, and third ports, the second port and the third port being made of a polarization-sensitive optical fiber, configured to demultiplex a light beam, input from the first port, into polarization components which are orthogonal to each other and output the demultiplexed light components from the second port and the third port, respectively;
a first polarization-sensitive optical amplifying fiber unit connected to the second port of the polarization multiplexer/demultiplexer and having a polarization-sensitive optical amplifying fiber;
a second polarization-sensitive optical amplifying fiber unit connected to the third port of the polarization multiplexer/demultiplexer and having a polarization-sensitive optical amplifying fiber;
optical multiplexers/demultiplexers connected to the first polarization-sensitive optical amplifying fiber unit and the second polarization-sensitive optical amplifying fiber unit, respectively, to input the pump light beams into the first polarization-sensitive optical amplifying fiber unit and the second polarization-sensitive optical amplifying fiber unit;
an optical discharge unit, connected between the first polarization-sensitive optical amplifying fiber unit and the second polarization-sensitive optical amplifying fiber unit to form an optical loop together with the first polarization-sensitive optical amplifying fiber unit and the second polarization-sensitive optical amplifying fiber unit, configured to discharge the pump light beams having propagated through the first polarization-sensitive optical amplifying fiber unit and the second polarization-sensitive optical amplifying fiber unit, respectively, to outside the optical loop; and
an optical circulator, having first, second, and third ports, which are made of an optical fiber, configured to output a signal light beam, that is input from the first port of the optical circulator and that is included in a predetermined wavelength bandwidth, to the second port of the optical circulator so as to input the signal light beam to the first port of the polarization multiplexer/demultiplexer connected to the second port of the optical circulator, and output a signal light beam, which has been polarization-demultiplexed by the polarization multiplexer/demultiplexer, parametrically amplified by a nonlinear optical effect in the first polarization-sensitive optical amplifying fiber unit and the second polarization-sensitive optical amplifying fiber unit due to the pump light beams in the optical loop, polarization-multiplexed by the polarization multiplexer/demultiplexer, and output from the first port of the polarization multiplexer/demultiplexer to the second port of the optical circulator, from the third port of the optical circulator.

2. The optical amplifier according to claim 1, wherein each of the first polarization-sensitive optical amplifying fiber unit and the second polarization-sensitive optical amplifying fiber unit includes a plurality of optical amplifying fibers and at least one relative phase shifter, inserted between the optical amplifying fibers, that changes a relative phase of an input light beam.

3. The optical amplifier according to claim 1, comprising a unit configured to adjust power levels of the pump light beams, input to the first polarization-sensitive optical amplifying fiber unit and the second polarization-sensitive optical amplifying fiber unit, respectively, in such a manner that gains of parametric amplifications performed by the first polarization-sensitive optical amplifying fiber unit and the second polarization-sensitive optical amplifying fiber unit have a difference equal to or less than 0.5 dB in at least one wavelength in a gain wavelength bandwidth of the parametric amplifications.

4. The optical amplifier according to claim 1, comprising a unit configured to adjust at least one of zero dispersion wavelengths of the first polarization-sensitive optical amplifying fiber unit and the second polarization-sensitive optical amplifying fiber unit, wavelengths of the pump light beams, and power of the pump light beams in such a manner that gain waveforms of parametric amplifications respectively performed by the first polarization-sensitive optical amplifying fiber unit and the second polarization-sensitive optical amplifying fiber unit have a difference equal to or less than 0.5 dB at least in a signal wavelength bandwidth including the signal light beam in a gain wavelength bandwidth of the parametric amplifications.

5. The optical amplifier according to claim 1, comprising a unit configured to monitor respective power levels of ASE light beams at a wavelength outside a signal wavelength bandwidth including the signal light beam in a gain wavelength bandwidth of gains of parametric amplifications performed by the first polarization-sensitive optical amplifying fiber unit and the second polarization-sensitive optical amplifying fiber unit, respectively, and adjust power levels of the pump light beams input to the first polarization-sensitive optical amplifying fiber unit and the second polarization-sensitive optical amplifying fiber unit, respectively, in such a manner that respective gain waveforms of the parametric amplifications have a difference equal to or less than 0.5 dB at least in a signal wavelength bandwidth including the signal light beam in a gain wavelength bandwidth of the parametric amplifications.

6. The optical amplifier according to claim 1, wherein the pump-light source unit includes a pump light source, one optical fiber amplifier that amplifies a pump light beam output from the pump light source, and a unit that splits a pump light beam output from the optical fiber amplifier into two pump light beams so as to input the two pump light beams to the first polarization-sensitive optical amplifying fiber unit and the second polarization-sensitive optical amplifying fiber unit, respectively.

7. The optical amplifier according to claim 1, wherein the optical multiplexers/demultiplexers are connected to the first port or the second port of the optical circulator, respectively.

8. The optical amplifier according to claim 1, wherein the optical discharge unit is configured to discharge an idler light beam along with the pump light beams to outside the optical loop.

9. The optical amplifier according to claim 1, wherein the optical discharge unit is configured to discharge light beams having wavelengths outside a signal wavelength bandwidth including the signal light beam along with the pump light beams to outside the optical loop.

10. The optical amplifier according to claim 1, wherein the optical discharge unit is configured to discharge light beams of polarization components orthogonal to the signal light beam along with the pump light beams to outside the optical loop.

11. The optical amplifier according to claim 1, wherein each of the first polarization-sensitive optical amplifying fiber unit and the second polarization-sensitive optical amplifying fiber unit includes a previous-stage polarization-sensitive optical amplifying fiber and a subsequent-stage polarization-sensitive optical amplifying fiber having respective refractive indexes of core portions different from each other.

12. The optical amplifier according to claim 1, wherein the first polarization-sensitive optical amplifying fiber unit and the second polarization-sensitive optical amplifying fiber unit have respective zero dispersion wavelengths different from each other.

13. An optical amplification system comprising the optical amplifier according to claim 1.

14. A wavelength converter comprising the optical amplifier according to claim 1.

15. An optical communication system comprising the optical amplifier according to claim 1.

* * * * *